US009667556B2

(12) United States Patent
Jackson et al.

(10) Patent No.: US 9,667,556 B2
(45) Date of Patent: May 30, 2017

(54) ADJUSTING CONNECTION VALIDATING CONTROL SIGNALS IN RESPONSE TO CHANGES IN NETWORK TRAFFIC

(71) Applicant: Nicira, Inc., Palo Alto, CA (US)

(72) Inventors: Ethan J. Jackson, San Francisco, CA (US); Keith E. Amidon, Los Altos, CA (US); Andy Zhou, Gilroy, CA (US)

(73) Assignee: NICIRA, INC., Palo Alto, CA (US)

( * ) Notice: Subject to any disclaimer, the term of this patent is extended or adjusted under 35 U.S.C. 154(b) by 367 days.

(21) Appl. No.: 14/069,342

(22) Filed: Oct. 31, 2013

(65) Prior Publication Data
US 2015/0089048 A1 Mar. 26, 2015

Related U.S. Application Data

(60) Provisional application No. 61/881,949, filed on Sep. 24, 2013.

(51) Int. Cl.
*G06F 15/16* (2006.01)
*H04L 12/825* (2013.01)
*H04L 12/26* (2006.01)

(52) U.S. Cl.
CPC .......... *H04L 47/25* (2013.01); *H04L 43/0888* (2013.01); *H04L 43/0894* (2013.01); *H04L 43/103* (2013.01)

(58) Field of Classification Search
CPC .............. H04N 21/238; H04L 12/4013; H04L 25/0262; H04L 43/0894; H04L 47/266
See application file for complete search history.

(56) References Cited

U.S. PATENT DOCUMENTS

| | | | |
|---|---|---|---|
| 5,550,816 A | 8/1996 | Hardwick et al. | |
| 5,949,757 A * | 9/1999 | Katoh et al. | 370/232 |
| 6,111,876 A | 8/2000 | Frantz et al. | |
| 6,219,699 B1 | 4/2001 | McCloghrie et al. | |
| 6,487,183 B1 | 11/2002 | Lo et al. | |
| 6,512,745 B1 | 1/2003 | Abe et al. | |
| 6,963,585 B1 | 11/2005 | Le Pennec et al. | |
| 7,013,342 B2 | 3/2006 | Riddle | |
| 7,046,630 B2 | 5/2006 | Abe et al. | |
| 7,379,465 B2 | 5/2008 | Aysan et al. | |

(Continued)

FOREIGN PATENT DOCUMENTS

WO WO 2010/041996 4/2010

OTHER PUBLICATIONS

Portions of prosecution history of U.S. Appl. No. 14/069,340, Jul. 28, 2015 (mailing date), Jackson, Ethan J., et al.
(Continued)

*Primary Examiner* — Esther B Henderson
(74) *Attorney, Agent, or Firm* — Adeli LLP

(57) ABSTRACT

Some embodiments provide a method for reducing the transmission of connection validating control signals when they are not needed. Network entities transmit connection validating control signals over network connections at regular intervals to validate that the network connections and the network entities remain functional. The method monitors data traffic fluctuations on the network connections to determine when connection validating control signals may not be needed. The method reduces unnecessary connection validating control signals in order to optimize the usage of network resources.

20 Claims, 18 Drawing Sheets

(56) References Cited

U.S. PATENT DOCUMENTS

| | | | |
|---|---|---|---|
| 7,606,229 B1 | 10/2009 | Foschiano et al. | |
| 7,606,260 B2 | 10/2009 | Oguchi et al. | |
| 7,643,488 B2 | 1/2010 | Khanna et al. | |
| 7,668,104 B1 * | 2/2010 | Pannell | H04L 47/10 370/235 |
| 7,792,987 B1 | 9/2010 | Vohra et al. | |
| 7,808,919 B2 | 10/2010 | Nadeau et al. | |
| 7,826,482 B1 | 11/2010 | Minei et al. | |
| 7,937,438 B1 | 5/2011 | Miller et al. | |
| 7,974,202 B2 | 7/2011 | Solomon | |
| 8,031,633 B2 | 10/2011 | Bueno et al. | |
| 8,055,789 B2 | 11/2011 | Richardson et al. | |
| 8,146,148 B2 | 3/2012 | Cheriton | |
| 8,224,971 B1 | 7/2012 | Miller et al. | |
| 8,259,571 B1 | 9/2012 | Raphel et al. | |
| 8,312,129 B1 | 11/2012 | Miller et al. | |
| 8,351,418 B2 | 1/2013 | Zhao et al. | |
| 8,611,352 B2 | 12/2013 | Mizrahi et al. | |
| 8,625,616 B2 | 1/2014 | Vobbilisetty et al. | |
| 8,644,188 B1 | 2/2014 | Brandwine et al. | |
| 8,825,900 B1 | 9/2014 | Gross, IV et al. | |
| 2004/0097232 A1 | 5/2004 | Haverinen | |
| 2004/0213298 A1 | 10/2004 | Sato | |
| 2005/0053079 A1 | 3/2005 | Havala | |
| 2006/0002370 A1 | 1/2006 | Rabie et al. | |
| 2006/0026225 A1 | 2/2006 | Canali et al. | |
| 2006/0171350 A1 * | 8/2006 | Taniguchi et al. | 370/328 |
| 2006/0193266 A1 | 8/2006 | Siddha et al. | |
| 2006/0245438 A1 | 11/2006 | Sajassi et al. | |
| 2007/0098006 A1 | 5/2007 | Parry et al. | |
| 2007/0130366 A1 | 6/2007 | O'Connell et al. | |
| 2007/0280243 A1 | 12/2007 | Wray et al. | |
| 2007/0280277 A1 * | 12/2007 | Lund | 370/412 |
| 2007/0286137 A1 | 12/2007 | Narasimhan et al. | |
| 2008/0025249 A1 | 1/2008 | Kuppuswamy et al. | |
| 2008/0031263 A1 | 2/2008 | Ervin et al. | |
| 2008/0198858 A1 | 8/2008 | Townsley et al. | |
| 2008/0285452 A1 | 11/2008 | Oran | |
| 2008/0285463 A1 | 11/2008 | Oran | |
| 2008/0291910 A1 | 11/2008 | Tadimeti et al. | |
| 2008/0291927 A1 | 11/2008 | Yong et al. | |
| 2009/0116381 A1 * | 5/2009 | Kanda | 370/229 |
| 2009/0141729 A1 | 6/2009 | Fan | |
| 2010/0098092 A1 | 4/2010 | Luo et al. | |
| 2010/0254385 A1 | 10/2010 | Sharma et al. | |
| 2011/0211449 A1 | 9/2011 | Attar et al. | |
| 2011/0261812 A1 | 10/2011 | Kini et al. | |
| 2011/0299402 A1 | 12/2011 | Vobbilisetty et al. | |
| 2012/0131643 A1 | 5/2012 | Cheriton | |
| 2013/0138830 A1 | 5/2013 | Fang | |
| 2015/0085655 A1 | 3/2015 | Jackson et al. | |

OTHER PUBLICATIONS

Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.

Farinacci, D., et al., "Generic Routing Encapsulation (GRE)," Mar. 2000, pp. 1-9, The Internet Society (RFC 2784).

Koponen, Teemu, et al., "Network Virtualization in Multi-tenant Datacenter," Technical Report TR-2013-001E, International Computer Science Institute & UC Berkeley, Aug. 2013, 22 pages, VMware, Inc., Palo Alto, CA, USA.

Mahalingam, M, et al., "XVLAN: A Framework for Overlaying Virtualized Layer 2 Networks over Layer 3 Networks; draft-mahalingam-dutt-dcops-vxlan-00.txt," Aug. 26, 2011, pp. 1-20.

Pfaff, B., et al., "The Open vSwitch Database Management Protocol," Aug. 20, 2012, 34 pages, Nicira, Inc. available at http://tools.ietf.org/html/draft-pfaff-ovsdb-proto-00.

Sridharan, M., et al., "NVGRE: Network Virtualization using Generic Routing Encapsulation; draft-sridharan-virtualization-nvgr-02.txt," Feb. 25, 2013, pp. 1-17, Internet Engineering Task Force.

* cited by examiner

ADJUSTING CONNECTION VALIDATING CONTROL SIGNALS IN RESPONSE TO CHANGES IN NETWORK TRAFFIC

CLAIM OF BENEFIT TO PRIOR APPLICATIONS

This application claims benefit to U.S. Provisional Patent Application 61/881,949, filed Sep. 24, 2013, which is incorporated herein by reference.

BACKGROUND

In computer networking, there are numerous techniques for verifying the functionality of network connections. Some of these techniques involve network entities repeatedly sending messages to each other across connections in order to demonstrate their vitality. When a network entity ceases to transmit such messages, the would-be recipient of said messages can assume that the sender and/or the connection is inactive (or in a failed state). Transmitting these messages is not a costless operation. Each transmission consumes processing cycles on each sending and receiving network entity. There is a need in the art for a way to manage the transmission of these messages.

BRIEF SUMMARY

For a network that has network entities that transmit connection validating control signals at regular intervals to validate the network connections and the operation of the network entities, some embodiments provide a method that reduces the transmission of connection validating control signals when such control signals are not needed or not needed as much. The method monitors data traffic fluctuations on the network connections to determine whether the connection validating control signals need to be sent out at a particular rate (e.g., a default rate). When the method determines that the control signals are not needed at their current rate, the method reduces the rate of these control signals in order to optimize the usage of network resources. As the data transmission rates change, the method in some embodiments might further decrease the control signal rate, or it might increase the control signal rate. In some embodiments, the method eliminates the control signals altogether until it detects that it needs to restart transmission of such rates.

In some embodiments, the connection validating control signals are control packets transmitted in a Bidirectional Forwarding Detection Session (BFD Session). A BFD Session is established on a network connection between two network entities. The BFD Session transmits control packets between the two network entities over the network connection. When a first entity no longer receives control packets from a second network entity, the first can conclude that the second network entity or the connection to the second network entity has failed. In this way, the BFD Session allows network entities to have a way of determining when they should commence failover processes.

However, in dense networks, sending control packets between network connections can result in substantial network overhead. The method of some embodiments reduces the rate of control packets. In some embodiments, the method reduces control packet frequencies on a network connection when less traffic is being transmitted over the network connection. In this case, the network connection has become a lower priority network connection and less bandwidth should be directed towards guaranteeing its vitality. In some embodiments, the method significantly reduces or even stops transmission of control packets over a network connection when the network connection has high amounts of data traffic. In this case, the control packets are redundant with the heavy traffic on the network connection. Further examples will be discussed below in the Detailed Description.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a network that has network entities that transmit connection validating control signals at regular intervals to validate the network connections and the operation of the network entities, some embodiments provide a method that reduces the transmission of connection validating control signals when such control signals are not needed or not needed as much. The method monitors data traffic fluctuations on the network connections to determine whether the connection validating control signals need to be sent out at a particular rate (e.g., a default rate). When the method determines that the control signals are not needed at their current rate, the method reduces the rate of these control signals in order to optimize the usage of network resources. As the data transmission rates change, the method in some embodiments might further decrease the control signal rate, or it might increase the control signal rate. In some embodiments, the method eliminates the control signals altogether until it detects that it needs to restart transmission of such rates.

Figure 1:
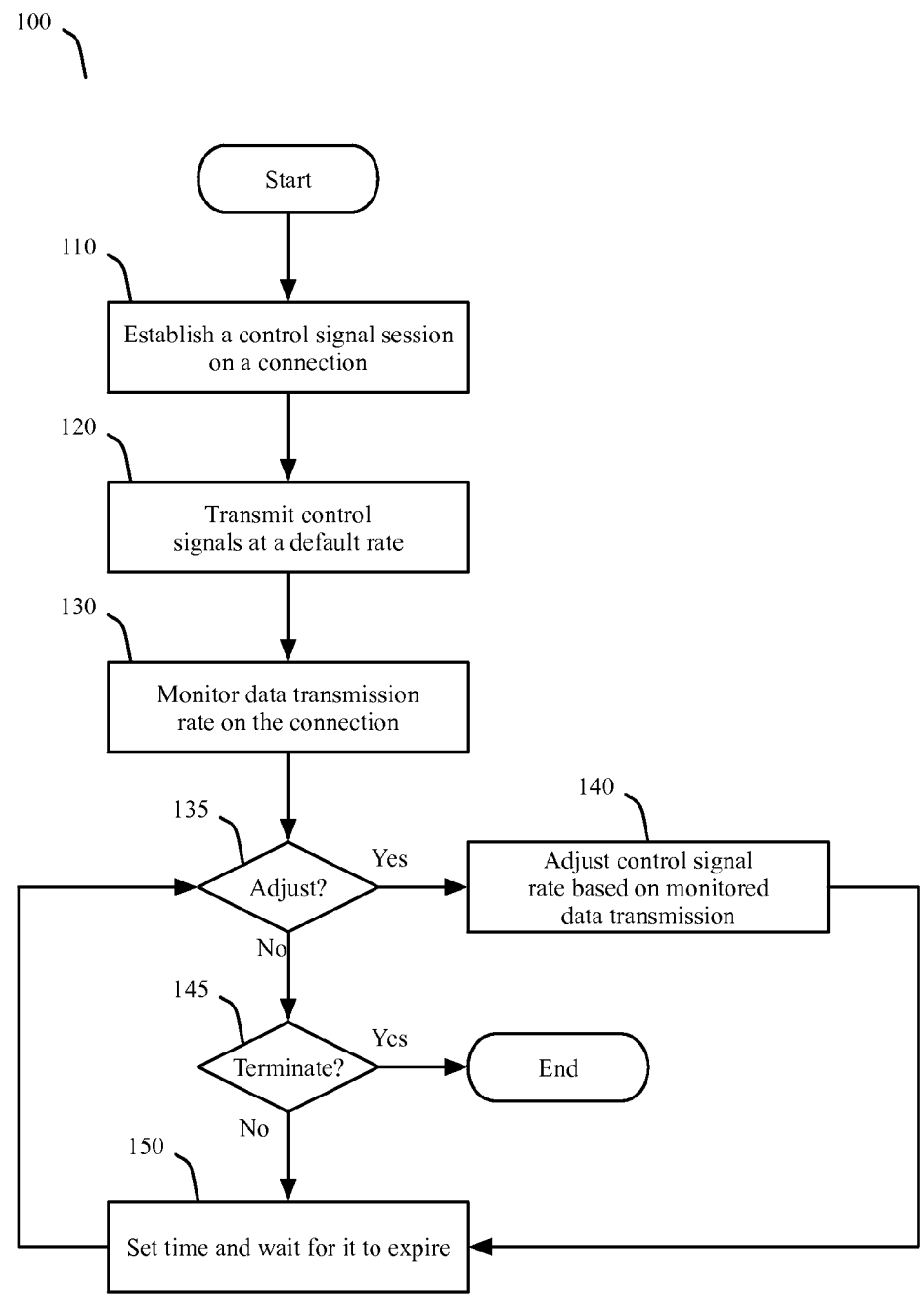
FIG. 1 conceptually illustrates a process of some embodiments for managing a control signal session.

FIG. 1 conceptually illustrates a process 100 that some embodiments use to manage a control signal session on a connection. In some embodiments, a control-signal processor on a network entity performs the process 100. As shown in this figure, the process 100 begins when the process 100 establishes (at 110) a control signal session on a connection between at least two network entities. The control signal session of some embodiments transmits connection validating control signals between network entities to validate their network connection and the vitality of the network entities.

In different embodiments, the control signal session takes different forms. However, in general, the control signal session includes the transmission of some form of connection validating control signals (also referred to as network validating control signals below) over a connection in some embodiments. The process 100 can be deployed on any type of connection capable of transmitting network validating control signals. For instance, the process 100 can be deployed on any telecommunication connection. Process 100 can also regulate connection validating control signals over physical wires, wireless connections, tunnels, VPNs, Bluetooth connections, and other such comparable telecommunication systems or protocols (e.g., connections along various communication layers of the OSI 7 layer model). In several embodiments described below, the control packets that are transmitted between network entities are part of a Bi-directional Forwarding Detection Session (hereinafter "BFD Session"). However, one of ordinary skill will realize that some embodiments are used in other types of communication sessions, as mentioned above.

Once established, process 100 transmits (at 120) control signals over the connection between its entity and another entity that connects through the connection. In some embodiments, the control signals are in the form of network packets that are sent along the connection. Next, the process 100 monitors (at 130) data transmission rates on the connection. Data transmission over the connection can take many forms based on the type of connection. The types of data transmission used in some embodiments include: data signals along wired or wireless connections, light signals (along an optical connection), etc. Also, in some embodiments, multiple different data sessions may use a connection between two entities, and the process monitors the data rates across all of these sessions. In other embodiments, the process 100 only relates to one of the data sessions along a connection and hence monitors the data transmission rate along the connection for its data sessions.

Next, the process 100 determines (135) whether it should adjust the rate of control signal transmissions based on the monitored rates of data transmission. If so, the process transitions to 140 to adjust the control signal rate based on the monitored rates of data transmission. In some embodiments, the process 100 adjusts the control signal rate for a variety of different monitored data transmission rate characteristics. In some embodiments, the process 100 reduces control signal frequency on the connection when data transmission falls below a low threshold level, which is indicative of the low importance of the connection. Alternatively or conjunctively, the process 100 of some embodiments reduces or eliminates control signal frequency on a high traffic connection due to the control signals becoming redundant with the high traffic. After reducing or eliminating control signal transmissions, the process may increase (at 140) the control signal transmission rates in some embodiments when the data transmission rates change and such a change requires adjustment to the control signal transmission rate. After 140, the process transitions to 150, which will be further described below.

When the process determines (at 135) that it should not adjust the control signal rate, the process determines (at 145) whether it should terminate. The process terminates in some embodiments when it detects that the connection has failed or detects some other terminating criteria. If the process determines that it should terminate, it ends. Otherwise, at 150, the process sets a timer and waits for this timer to expire before it transitions back to 130 to monitor the data transmission rate again.

Several more detailed examples of managing control signals in BFD sessions are described below. Specifically, Section II describes adjusting BFD control signal rates when connections transmit low amounts of data traffic. Section III then describes adjusting BFD control signal rates when connections transmit high amounts of data traffic. Section IV then describes the implementation and deployment of the invention on network entities. Section V then describes an electronic system for implementing the invention. Before describing these additional examples, the environment in which some embodiments of the invention are implemented will be described below in section I.

I. Environment

Figure 2:
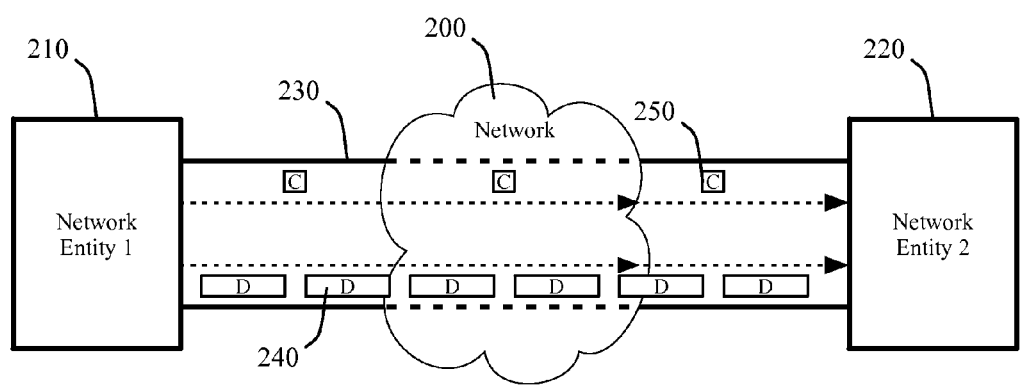
FIG. 2 conceptually illustrates a network that includes two network entities passing data and control packets over a link.

The following section describes an environment in which some embodiments of the inventions are implemented. FIG. 2 conceptually illustrates a network 200 that includes network entity 210 transmitting data packets 240 and control packets 250 over a link 230 to network entity 220. For explanation purposes, FIG. 2 conceptually illustrates rates of packet transmission as discrete quantities of packets (e.g. three control packets and six data packets). Some embodiments of the invention would be deployed to such a network 200 to manage rates at which control packets 250 are sent between network entities 210 and 220.

Network 200 is conceptually illustrated as a simple communication network between network entity 210 and network entity 220 over link 230. Networks of some embodiments are computer networks that enable electronic devices to share information over telecommunications systems. Examples of networks that some embodiments of the invention can be applied to include: local area networks, Ethernet networks, virtual networks, wireless networks, the Internet, and other such comparable telecommunication systems.

Network entities 210 and 220 are two electronic devices sharing information over link 230. The network entities of some embodiments can be any electronic devices with the ability to connect to other network entities over a network. Examples of network entities of some embodiments include: network nodes, hosts, endpoints, computers, mobile devices, switches, servers, virtual switches, hypervisors, routers, and other such comparable devices capable of telecommunication. Network entities communicate with each other over telecommunications via links.

Link 230 is a bi-directional telecommunication connection between network entities 210 and 220. However, for explanation purposes, FIG. 2 only shows data packets 240 and control packets 250 being transmitted in one particular direction. Furthermore, as link 230 is a bi-directional link, network entity 220 may also transmit control and data packets to network entity 210, although this is not illustrated in the figure. Links establish means by which information can be passed between network entities. Bi-directional links allow two-way communication between two connected network entities. Uni-directional links may be deployed; however, uni-directional links are not suitable for establishing a bi-directional forwarding detection session without some additional method of communication across the uni-directional link. Unless otherwise disclosed, the term "link" refers to a bi-directional link throughout the examples provided. Examples of such links on which some embodiments of the invention are implemented include: physical wires, wireless connections, tunnels, VPNs, Bluetooth connections, and other such comparable telecommunication systems or protocols. Other additional examples of links include the various communication layers of the OSI 7 layer model, such as physical, data link, network, transport, session, presentation, and application layer communications.

As shown in FIG. 2, network entity 210 transmits information to network entity 220 using data packets 240 and control packets 250. Data packets 240 are conceptually illustrated as a series of square packets with a "D" identifier. As illustrated, these data packets 240 are being sent along link 230 from entity 210 to entity 220. Control packets 250 are conceptually illustrated as a series of square packets with a "C" identifier. As illustrated, these control packets 250 are also being sent along link 230 from entity 210 to entity 220. While FIG. 2 is conceptually illustrated to include three control packets and six data packets, this illustration is not intended to depict an actual ratio of control to data packets. In some embodiments, there are hundreds of data packets per single control packet transmitted on a deployed link. The relative rates of control and data packets illustrated in the figures convey a conceptual notion of changes in their individual frequencies, not the relative ratio of control packets to data packets.

Data packets 240 are formatted units of data that transport information between network entities 210 and 220 over network 200. Data packets typically include a header, a payload, and a trailer. The packet header includes control information such as the sender's and the recipient's IP addresses, the protocol governing the format of the payload and several other formats. The packet header's format is typically specified in its associated network protocol. An example of a network protocol includes the Internet protocol suite for relaying datagrams across network boundaries. The packet payload includes the cargo of the packet, in particular, the transmitted data that is the reason for the transmission. The packet trailer includes supplemental data placed at the end of a block of data being stored or transmitted. While FIG. 2 conceptually illustrates network entity 210 sending data packets 240 over a typical network type, some embodiments of the invention can be implemented using other methods of transmitting information over a telecommunications network, such as: signals, waves, lights, bits in a bit stream, cloud information with headers and trailers, and other such comparable systems and protocols for electronic transmission of information.

Control packets 250 are of a similar format to data packets 240, however control packets 250 are used to transmit control information in connection with a Bi-directional Forwarding Detection Session (hereinafter "BFD Session"). To establish a BFD Session, two network entities initially negotiate a BFD Session based on the particular networking protocol used by the entities (e.g., a TCP three-way handshake in TCP/IP). After entering the BFD Session, each network entity begins continuously sending control packets to the other network entity in the BFD Session to provide an indication to each other that the connection and network entities are still active. BFD Sessions provide a mechanism for detecting faults on a link. For instance, when a first network entity in a BFD Session does not receive control packets from a second entity in the BFD Session, the first entity may conclude that the second entity or link has failed. BFD Sessions can be used to verify the continued operations of network entities on all of the different types of links, including: physical wires, wireless connections, tunnels, VPNs, Bluetooth connections, and other such comparable telecommunication systems or protocols. While this example uses control packets, some embodiments of the invention provide other means of communicating control information in place of control packets, such as: metadata, cloud headers, etc.

BFD Sessions can be run in either asynchronous mode or demand mode. In asynchronous mode, both network entities periodically send control packets to each other. If a number of those control packets are not received, the session is considered inactive (or in a failed state). In demand mode, no control packets are exchanged after the session is established; in particular, it is assumed that each entity has alternative mechanisms to verify the connectivity to each other, such as on the underlying physical layer. However, either entity may still send control packets if needed. Control packets 250 can be "Hello" packets, which do not require a response from the recipient. Likewise, control packets 250 can be "Echo" packets, which do require the recipient to respond in order to verify the forwarding capability of the recipient. Either Hello packets or Echo packets can be used in embodiments of the invention. Further discussion of Hello packets and Echo packets will be discussed below in connection with FIG. 17.

As shown in FIG. 2, network entity 210 is sending control packets 250 at an initial default frequency. FIG. 2 is a conceptual representation of network traffic on a tunnel. As illustrated, three control packets 250 are being sent per six data packets 240 over link 230. This illustration is not intended to depict an actual ratio of control to data packets. In some embodiments, there may be hundreds of data packets per single control packet transmitted on a deployed link. As such, the relative rates of control and data packets illustrated in the figures convey only the conceptual notion of changes in individual frequencies, and not the relative ratio of control packets to data packets. The ratio of data and control packets may be completely different depending on the particular operations of the invention or the varying rates of data traffic between the network entities. In some embodiments of the invention, the particular rate of control packets 250 is actively managed based on the rate of data packets 240 in order to optimize the usage of network resources.

Figure 3:
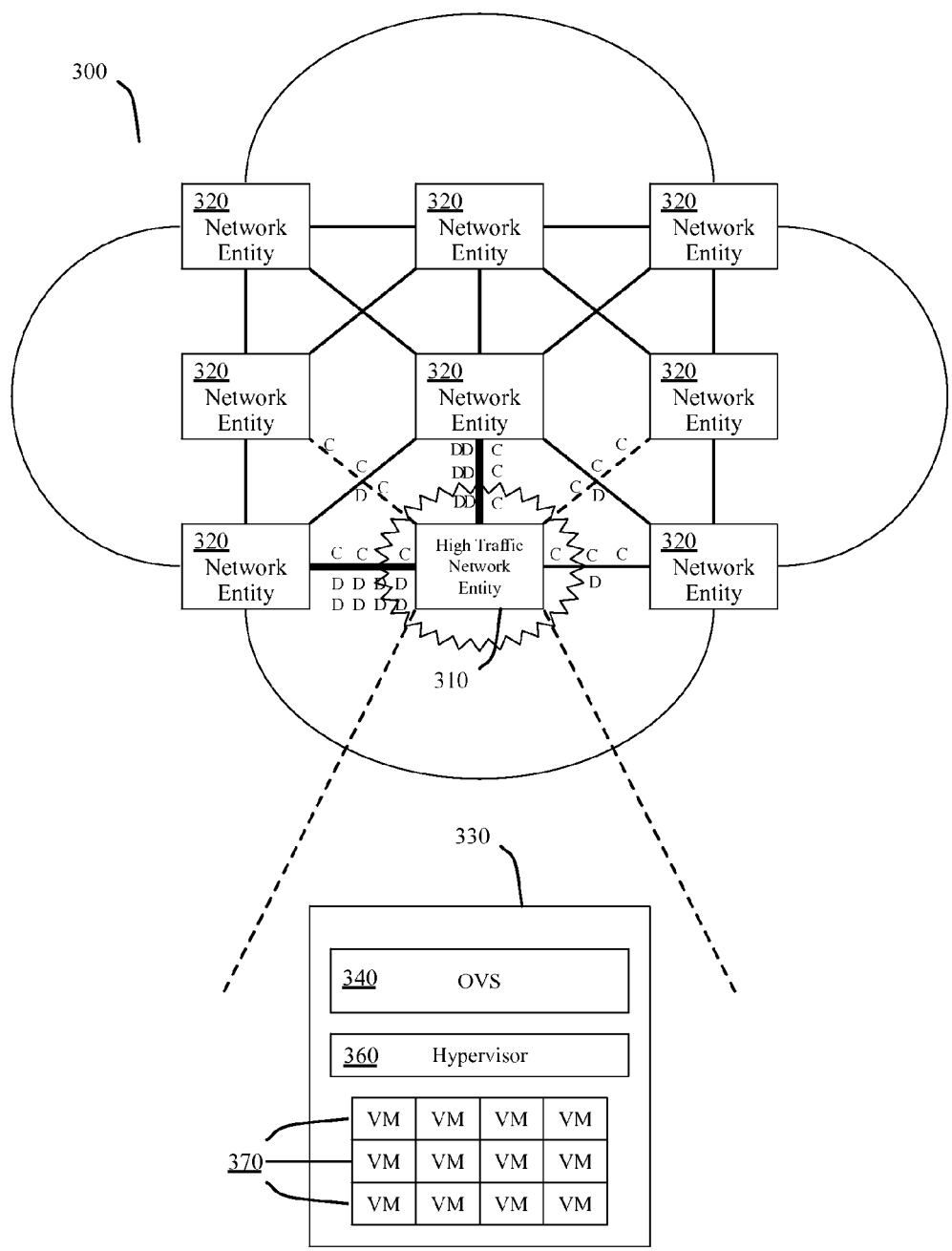
FIG. 3 conceptually illustrates a dense network with a high traffic network entity.

Transmitting control packets over BFD Sessions imposes costs on network resources. While FIG. 2 only shows two network entities in a BFD Session, some embodiments of the invention may be deployed in densely meshed networks with links between each network entity, and even links between multitudes of virtual structures across multiple network entities. FIG. 3 conceptually illustrates a network 300 with a dense mesh of links between various different network entities 320 and a high traffic network entity 310.

As shown in FIG. 3, the links between high traffic network entity 310 and network entities 320 are conceptually illustrated with a series of "C" and "D" packets streaming over the dashed and bolded links. The bolded links show heavy amounts of "D" data packets and a standard rate of "C" control packets. In light of the heavy data traffic, the transmission of control packets are redundant on the bolded links and thus an unnecessary use of the network resources. The dashed links show light amounts of "D" data and a standard rate of "C" control packets. The low traffic on the dashed links indicates that these are lower priority links. As a result, high traffic network entity 310 is processing both redundant and lower priority control packets in addition to all of the data packets. The jagged oval around high traffic network entity 310 indicates that it is in a state of stress due to the large volume of packets flowing over its links and the extraneous processing cycles that are being wasted on unnecessary control packets.

While the links are conceptually illustrated as single lines, these links can have multiple connections. In modern networking environments, connections between network entities often include multiple links across the same connection. For instance, as shown in expanded view 330, high traffic network entity 310 is running Open Virtual Switch 340 (hereinafter "OVS"), hypervisor 360, and virtual machines 370. Each of OVS 340, hypervisor 360, and virtual machines 370 could have links (e.g. tunnels) established with other network entities. Some embodiments of the invention are deployed to networks such as 300 to manage such compound links. A brief description of the elements shown in expanded view 330 follows below.

Open Virtual Switches of some embodiments routes network traffic between hypervisors and virtual machines coupled to the Open Virtual Switches. In this example, OVS 340 routes network data between virtual machines 370 that are running on high traffic network entity 310 to the OVSs running on network entities 320. Open Virtual Switches will be discussed in detail below in connection with FIG. 15.

The hypervisor 360 of some embodiments is a virtualization application that manages multiple operating systems (e.g., virtual machines 370) on network entities. That is, the hypervisor 360 provides a virtualization layer in which other operating systems can run with the appearance of full access to the underlying system hardware (not shown) of network entities except such access is actually under the control of the hypervisor 360. In this example, the hypervisor 360 manages virtual machines 370 running on high traffic network entity 310.

Virtual machines are software-implemented computers being run as programs on other devices. Virtual machines are each assigned a set of network layer host addresses (e.g., a MAC address for network layer 2, an IP address for network layer 3, etc.) and can send and receive network data to and from other network elements over the network. In this example, if the virtual machines 370 each have links to each other virtual machine on network entities 320, then the number of BFD Sessions to run over a fully meshed network of virtual machine links scales at a rate of $[N*(N-1)]/2$ where N equals the number of virtual machines on network 300. Accordingly, in such embodiments, it is essential to manage the usage of network traffic over such a dense mesh network. Extraneous control packets on BFD Sessions will result in network entities becoming overloaded and stressed, as illustrated by, for example, the high traffic network entity 310. Embodiments of the invention discussed below actively manage control packet rates to prevent situations like those described in FIG. 3.

II. Adjusting Control Signal Rates on Low Traffic Links

The following section describes embodiments of the invention that reduce control signal rates on control signal sessions when links transmit low amounts of data traffic. While the following examples discussed in FIGS. 4-8 discuss a BFD Processor managing BFD Session on links, some embodiments of the invention can be set up to monitor other types of control signal sessions other than BFD Sessions. In addition, different embodiments of the invention may use different types of transmission to send control signals other than network data packets.

Figure 4:
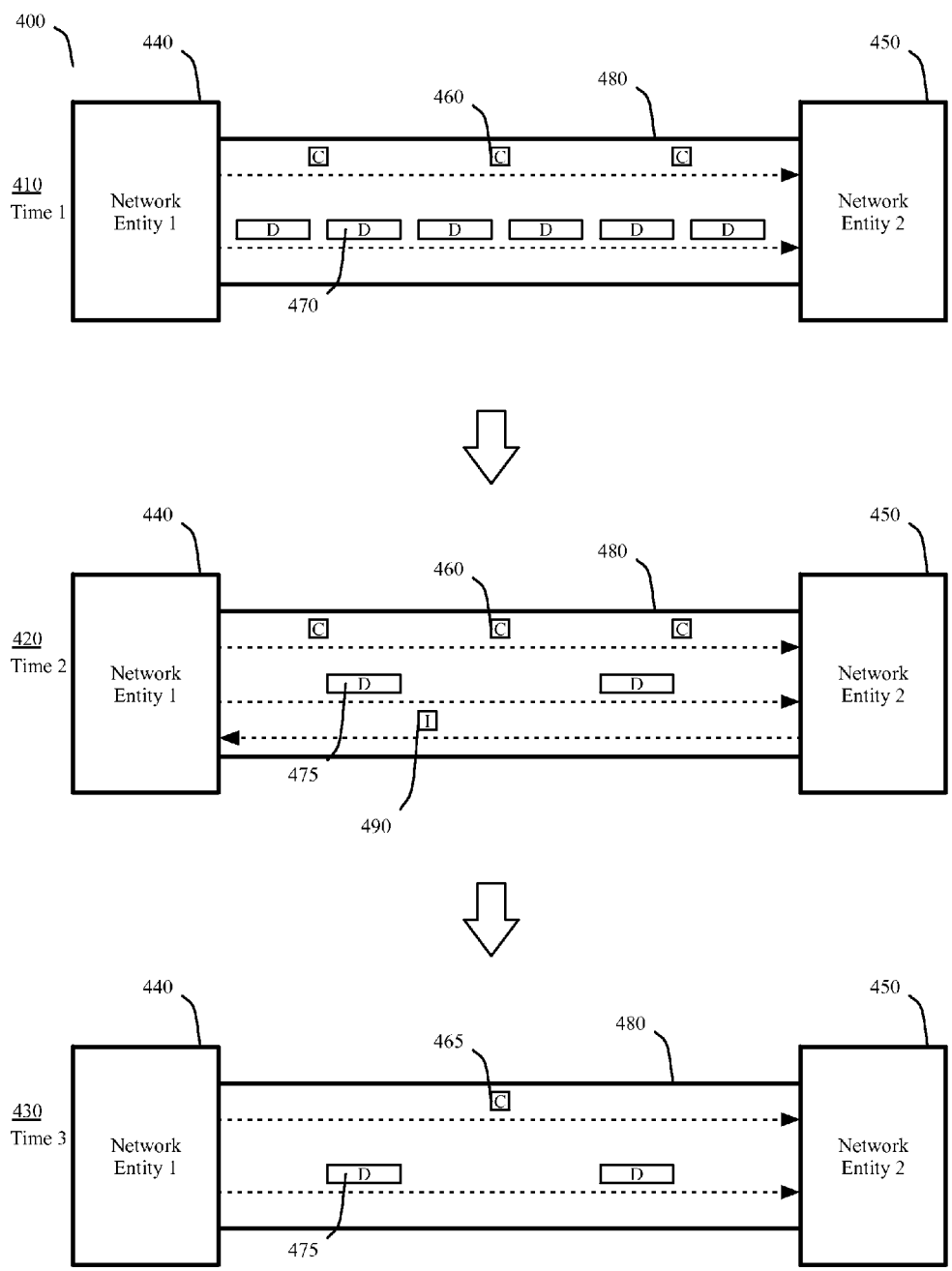
FIG. 4 conceptually illustrates an example BFD Session of some embodiments where control packet frequency is reduced when less data traffic is transmitted on a link.

FIG. 4 conceptually illustrates an example BFD Session 400 where a BFD Processor of some embodiments reduces control packet frequency when there is a reduction of data traffic being transmitted on link 480. BFD Session 400 is shown at three times 410, 420, and 430. Times 410, 420, and 430 are conceptual time captures that illustrate rates of packet transmission as discrete quantities of packets for ease of presentation.

The first time 410 illustrates network entity 440 transmitting control packets at rate 460 and data packets at rate 470 to network entity 450 over link 480. Control packets at rate 460 are being sent at an initial default frequency at the first time 410. In some embodiments, the initial default frequency for control packets is one control packet every 300 milliseconds. Different embodiments of the invention may use different initial default frequencies.

The second time 420 illustrates network entity 440 transmitting control packets at the same rate 460 and data packets at reduced rate 475 to network entity 450 over link 480. Reduced data packet rate 475 of the second time 420 transmits fewer data packets than that of data packet rate 470 of the first time 410. The reduced data packet rate 475 indicates that the link 480 is no longer transmitting as much data traffic from network entity 440 to network entity 450 compared to time 410. The BFD Processor of some embodiments reduces the rate of control packets being sent on BFD Session 400 because the reduced data traffic rate indicates that link 480 is now a lower priority link. Such control packet frequency reductions can produce substantial savings of unnecessary network resource usage when applied to many links over a densely linked network. In order to reduce a control packet frequency, the BFD Processor directs network entity 450 to transmit a communication 490 over link 480 to instruct network entity 440 to transmit control packets at a reduced frequency. In some embodiments the communication 490 is contained within a network packet.

In some embodiments in order to determine when to adjust a particular control packet rate, a threshold level of data packet transmission is provided to help determine when to modify a control packet rate. Once data packet transmission rates fall below the threshold level, the BFD Processor of some embodiments reduces control packet frequencies. In some embodiments the threshold level of data transmission for a particular link is computed as a multiple of a minimum transmission rate for the particular link (e.g. the minimum transmission rate is one packet per minute and the threshold level for control packet frequency reduction is three packets per minute).

The third time 430 illustrates network entity 440 transmitting control packets at reduced rate 465 and data packets at reduced rate 475 to network entity 450 over link 480. The reduced rate of control packets 465 allows for less bandwidth and processing resources to be directed at a lower priority connection from network entity 440 to network entity 450. In some embodiments, only two rates of control packets are available, the initial default rate corresponding to rate of control packets 460, and a reduced rate corresponding to the reduced rate of control packets 465. In some embodiments, the reduced rate of control packets 465 scales variably based on the rate of data packets. In some embodiments, a floor for the rate of control packets is provided.

Figure 5:
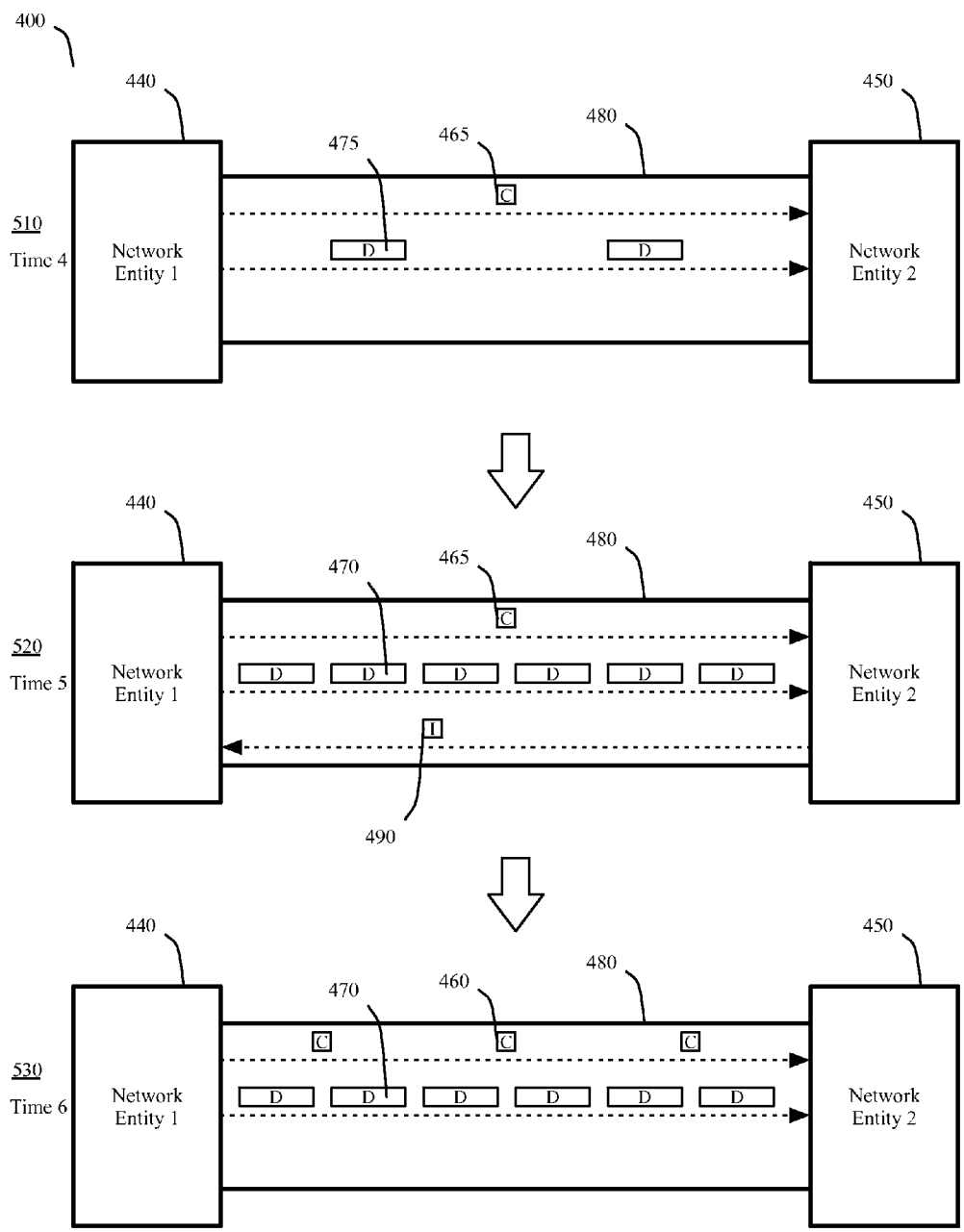
FIG. 5 conceptually illustrates an example BFD Session of some embodiments where control packet frequency is increased when data traffic increases to a normal rate.

FIG. 5 conceptually illustrates the example BFD Session 400 from FIG. 4 after the BFD Processor has already reduced the rate of control packets from network entity 440 to network entity 450. In FIG. 5, the BFD Processor increases control packet transmission rates as data traffic reverts to a normal transmission rate on link 480. BFD Session 400 is shown at three times 510, 520, and 530. Times 510, 520, and 530 are conceptual time captures that illustrate rates of packet transmission as discrete quantities of packets for ease of presentation.

The fourth time 510 illustrates network entity 440 transmitting control packets at reduced rate 465 and data packets at reduced rate 475 to network entity 450 over link 480. The fifth time 520 illustrates network entity 440 transmitting control packets at the same reduced rate 465 and data packets at an increased rate 470 from time 510 to network entity 450 over link 480. In particular, data packet rate 470 corresponds to the initial data transmission rate shown in FIG. 4, at first time 410. As the data traffic has increased to the normal level, the BFD Processor of some embodiments increases the rate of control packets being sent on BFD Session 400. In order to adjust the control packet frequency, the BFD Processor directs network entity 450 to transmit a communication 490 over link 480 to instruct network entity 440 to transmit control packets at the initial increased frequency. The sixth time 530 illustrates network entity 440 once again transmitting control packets at the initial rate 460 and data packets at rate 470 to network entity 450 over link 480. In some embodiments, network entity 450 instructs network entity 440 to transmit control packets at an increased rate that is different from the initial rate 460.

Figure 6:
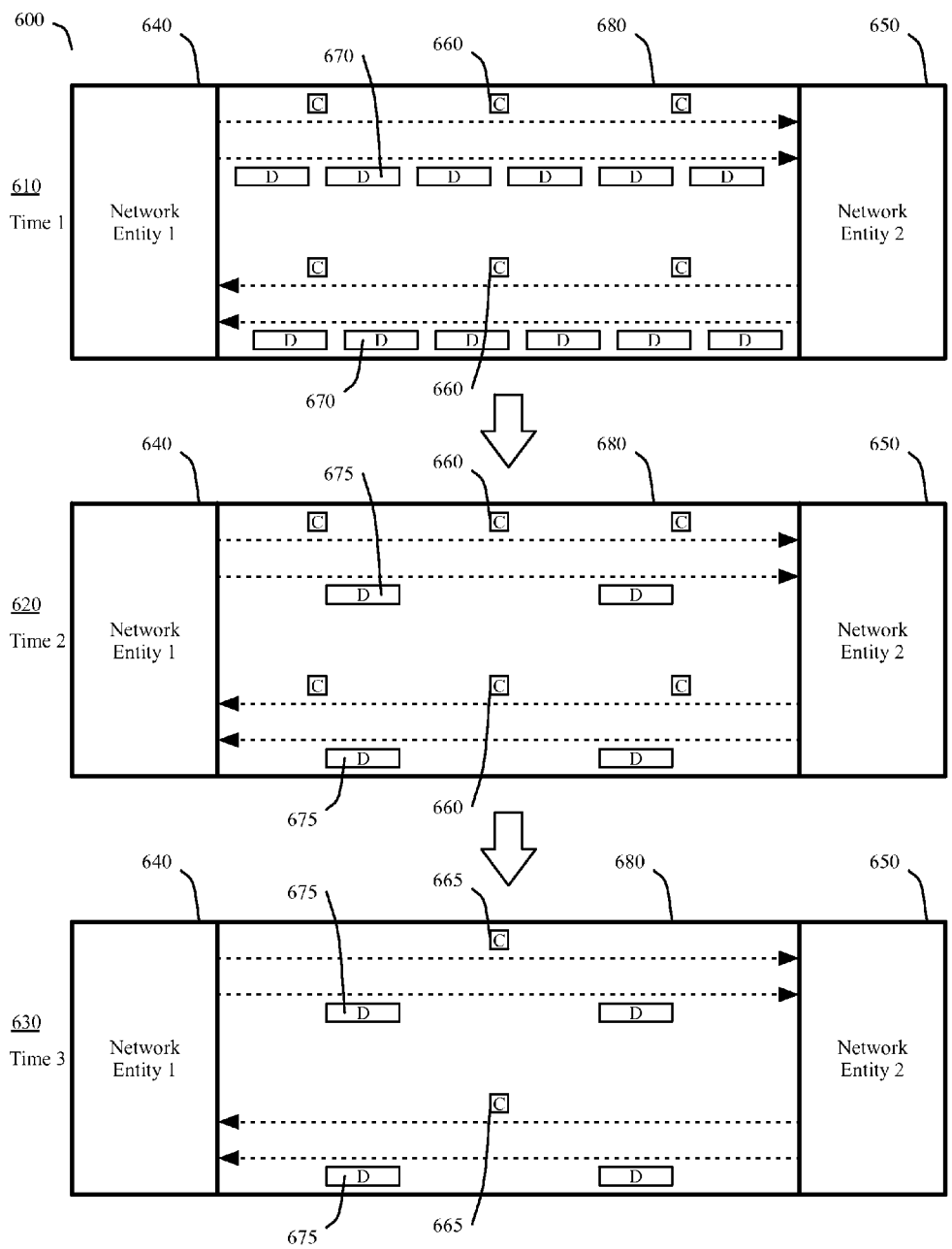
FIG. 6 conceptually illustrates an example BFD Session of some embodiments where control packet frequency is reduced in both directions on a link.

Link 480 is illustrated with control packets and data packets only being sent from network entity 440 to network entity 450; however link 480 is a bi-directional link as indicated by the communication 490. As discussed above, BFD Sessions are typically only set up on bi-directional links with data going in both directions. FIG. 6 conceptually illustrates an example BFD Session 600 where a BFD Processor of some embodiments reduces control packet frequency in both directions on a link 680 when less data traffic is being transmitted in both directions along the link. BFD Session 600 is shown at three times 610, 620, and 630. Times 610, 620, and 630 are conceptual time captures that illustrate rates of packet transmission as discrete quantities of packets for ease of presentation.

The first time 610 illustrates network entity 640 transmitting control packets at rate 660 and data packets at rate 670 to network entity 650 over link 680. Additionally, first time 610 illustrates network entity 650 transmitting control packets at rate 660 and data packets at rate 670 to network entity 640 over link 680. Control packets at rate 660 are being sent at an initial default frequency at the first time 610.

The second time 620 illustrates both network entities 640 and 650 transmitting control packets at rate 660 and data packets at reduced rate 675. Reduced data packet rate 675 of the second time 620 transmits fewer data packets than that of data packet rate 670 of the first time 610. Because of the reduced data packet rates, the BFD Processor of some embodiments reduces the rate of control packets being sent on BFD Session 600. In order to effectuate a bi-lateral control packet frequency reduction, the BFD Processor directs both network entities 640 and 650 to instruct each other to transmit control packets at a reduced frequency. In some embodiments these instructions are transmitted over the already established link as separate packets of information. In some embodiments, the instructions are transmitted as information encoded within the control packets themselves.

The third time 630 illustrates both network entities 640 and 650 transmitting control packets at reduced rate 665 and data packets at reduced rate 675. The reduced rate of control packets 665 allows for less bandwidth and processing resources to be directed at a lower priority connection between network entities 640 and 650. In some embodiments, only two rates of control packets are available, the initial default rate corresponding to rate control packets 660, and a reduced rate corresponding to reduced rate of control packets 665. In some embodiments, the reduced rate of control packets 665 scales variably based on the rate of data packets.

Figure 7:
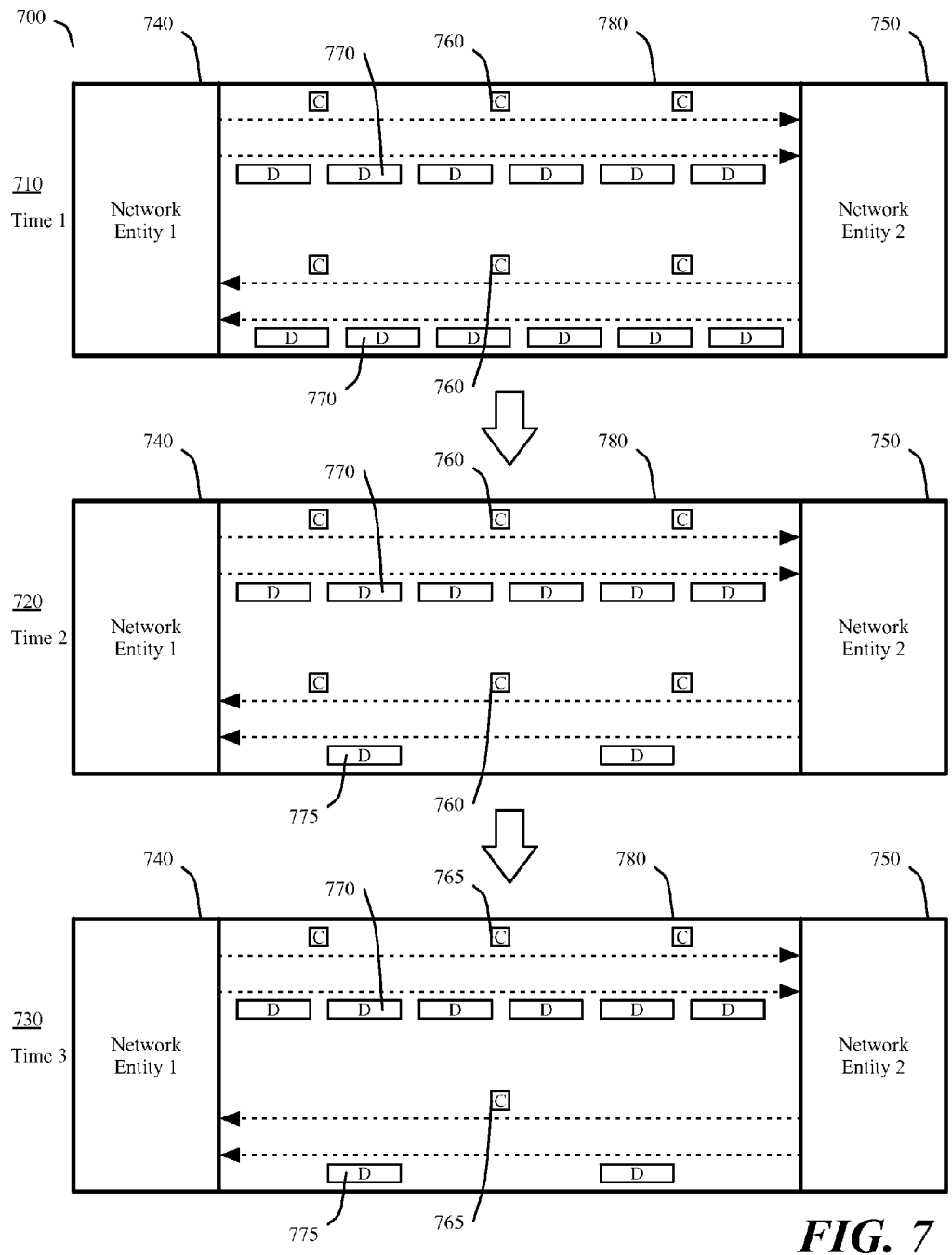
FIG. 7 conceptually illustrates an example BFD Session of some embodiments where control packet frequency is reduced in one direction but not the other.

As discussed above, link 680 is a bi-directional link with control and data packets being passed in both directions. Links regularly transmit data packets at different rates, and the BFD Processor of some embodiments manages control packets at corresponding different rates. FIG. 7 conceptually illustrates an example BFD Session 700 where a BFD Processor of some embodiments reduces control packet frequency in one direction on a link without reducing the control packet frequency on the other direction on the link. BFD Session 700 is shown at three times 710, 720, and 730. Times 710, 720, and 730 are conceptual time captures that illustrate rates of packet transmission as discrete quantities of packets for ease of presentation.

The first time 710 illustrates network entity 740 transmitting control packets at rate 760 and data packets at rate 770 to network entity 750 over link 780. Additionally, first time 710 illustrates network entity 750 transmitting control packets at rate 760 and data packets at rate 770 to network entity 740 over link 780. Control packets at rate 760 are being sent at an initial default frequency at the first time 710.

The second time 720 illustrates both network entities 740 and 750 transmitting control packets at the same rate 760 as time 710. However, data packets are being transmitted from network entity 750 to network entity 740 at reduced data rate 775. Whereas data packets are being transmitted from network entity 740 to network entity 750 at data rate 770. This example illustrates that the rates of data transmission can be different over bi-directional links, such as when a download of a large amount of data is occurring. The BFD Processor of some embodiments can regulate control packet rates independently in each direction on a bi-directional link. In order to reduce a control packet frequency, the BFD Processor directs network entity 740 to instruct network entity 750 to send control packets at a reduced frequency. In some embodiments, the instructions are transmitted as information encoded within the control packets themselves.

The third time 730 illustrates network entity 740 transmitting control packets at initial rate 760 and data packets at rate 770. However, network entity 750 is transmitting control packets at reduced rate 765 and data packets at reduced data rate 775. The reduced rate of control packets 765 allows for less bandwidth and processing resources to be directed at a lower priority connection from network entity 750 to network entity 740 without affecting the control packet rate going from network entity 740 to network entity 750.

Figure 8:
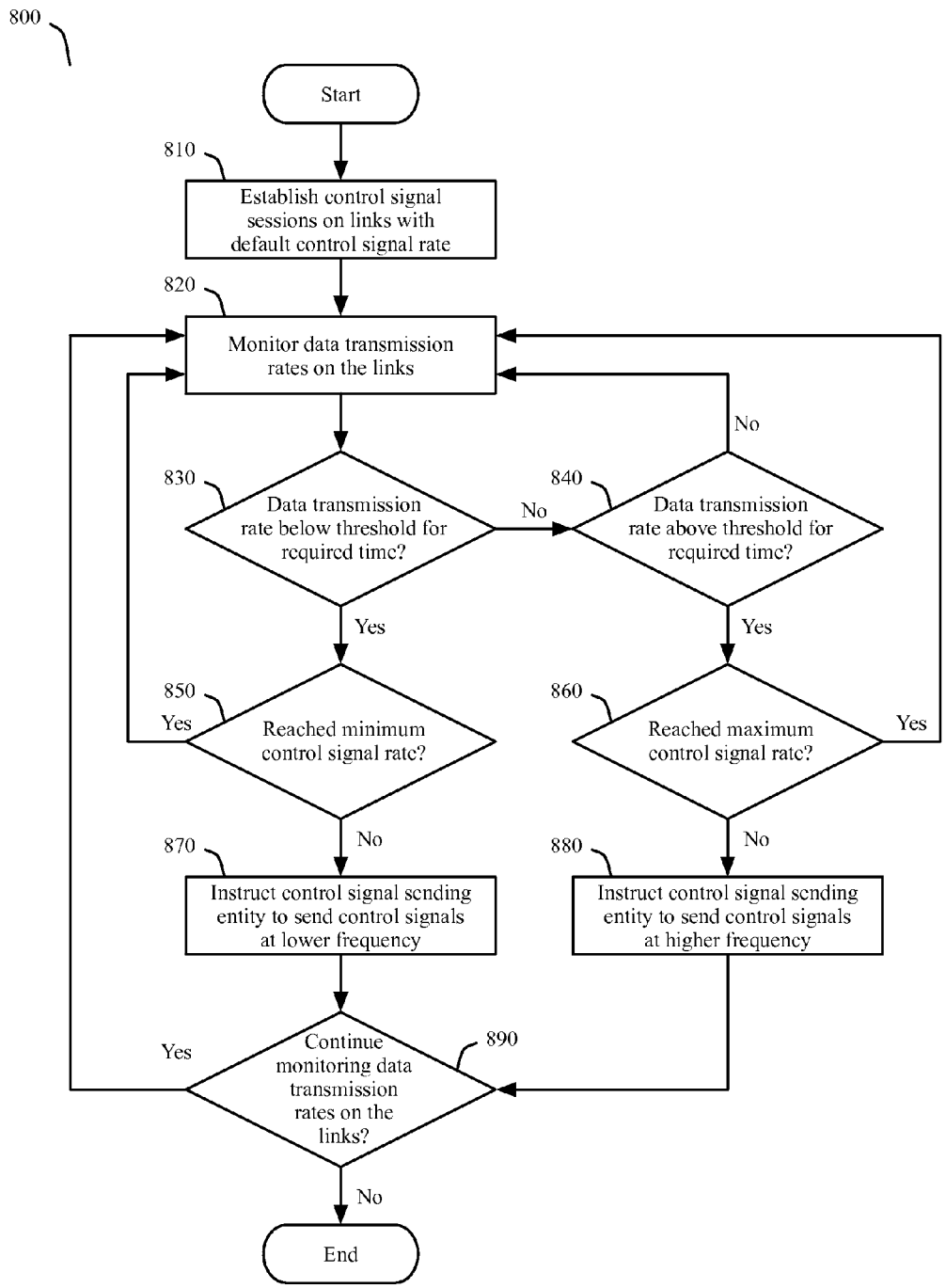
FIG. 8 conceptually illustrates a process of some embodiments for managing a rate of control packets over a link.

Having described several examples of the BFD Processor adjusting control packet frequencies in FIGS. 4-7, specific operations and feedback controls will now be described in conjunction with FIG. 8. FIG. 8 conceptually illustrates a process 800 that some embodiments of the invention perform to dynamically manage multiple control signal sessions. In some embodiments, a control signal processor running on a network entity performs the process 800. Examples of these different applications include: a BFD Processor, an OVS Instance, or a BFD Processor running as a module of an OVS Instance.

Initially, the process 800 establishes (at 810) control signal sessions on links with default control signal rates. The initial default frequency for control signals may vary in different embodiments of the invention. For instance, the default control signal rate can be between transmitting a control packet once every 100 milliseconds to once every 10,000 milliseconds. Some embodiments can have control signal rates beyond those enumerated here. The process 800 then monitors (at 820) data transmission rates on the links with established control signal sessions. As in the example shown in FIGS. 6 and 7, the control signal processor of some embodiments can independently regulate control signal frequencies of bi-directional links in both directions.

The process 800 then determines (at 830) whether a data transmission rate has fallen below a threshold for a required period of time. The process makes determination 830 in order to determine whether a data transmission rate has fallen to a level that could potentially require a decrease in control signal frequency, as in the example shown in FIG. 4. Different embodiments use different threshold rates and different required times. For instance, in some embodiments the threshold rate may be computed as a multiple of a minimum transmission rate for the particular link (e.g. the minimum transmission rate is one data signal per minute and the threshold level for control signal frequency reduction is three hundred data signals per minute). In some embodiments, the required time period can range from 2000 to 4000 milliseconds without receiving a packet. One of ordinary skill in the art will realize that other time thresholds are possible in different embodiments of the invention.

When a data transmission rate has fallen below a threshold for a required period of time, the process 800 determines (at 850) whether the control signal rate on the sub-threshold link has reached a minimum control signal rate. When the sub-threshold links are already at their minimum control signal frequency, the process returns to monitoring (at 820) the data transmission rate on the links. When a sub-threshold link has not reached its minimum control signal rate, the process 800 instructs (at 870) the control signal sending entity to send control signals at a lower frequency, as in the example shown in FIG. 4. The control signal processor of some embodiments is running as an instance on several network entities in a network. In such embodiments, the control signal processor instance running on the control signal receiving entity instructs the control signal sending entity to reduce the rate of control signals being sent.

Returning to determination 830 discussed above, when no data transmission rate has fallen below a threshold for a required period of time, the process 800 determines (at 840) whether any data transmission rates have exceeded a threshold for a required period of time. The process makes determination 840 in order to determine whether a data transmission rate has increased to a level that could potentially require an increase in control signal frequency, as in the example shown in FIG. 5. In some embodiments, the required period of time for the data transmission rate to be above the threshold at 840 is different than that required at 830.

When a data transmission rate has exceeded the threshold for the required period of time, the process 800 determines (at 860) whether the control signal rate on the threshold-passing link has reached a maximum control signal rate. When either no data transmission rate is above the required threshold or when the threshold-passing links are already at their maximum control signal frequency, the process returns to monitoring (at 820) the data transmission rates on the links. When a threshold-passing link has not reached its maximum control signal rate, the process 800 instructs (at 880) the control signal sending entity to send control signals at a higher frequency, as in the example shown in FIG. 5. The control signal processor of some embodiments is running as an instance on several network entities in a network. In such embodiments, the control signal processor instance running on the control signal receiving entity instructs the control signal sending entity to increase the rate of control signals being sent.

After either instructing a control signal sending entity to send control signals at a lower frequency (at 870) or a higher frequency (at 880), the process 800 determines (890) whether to continue monitoring data transmission rates on the links on which control signal sessions have been established. Should the process choose to cease monitoring the data transmission rates, the process 800 ends. Otherwise the process returns to monitoring data transmission rates on the links on which control signal sessions have been established (at 820). Having described adjusting control signal rates when data traffic is reduced or terminated, a different scenario will be described in the next section.

III. Adjusting Control Signal Rates on High Traffic Links

The following section describes embodiments of the invention that decrease or eliminate control signal rates (i.e., reduce control signal rate to zero control signals per minute) on control signal sessions when links experience rates of heavy data traffic. While the following examples discussed in FIGS. 9-14 discuss a BFD Processor managing BFD Sessions on links, some embodiments of the invention can be set up to monitor other types of control signal sessions other than BFD Sessions. In addition, different embodiments of the invention may use different types of transmissions to send control signals other than network packets.

Figure 9:
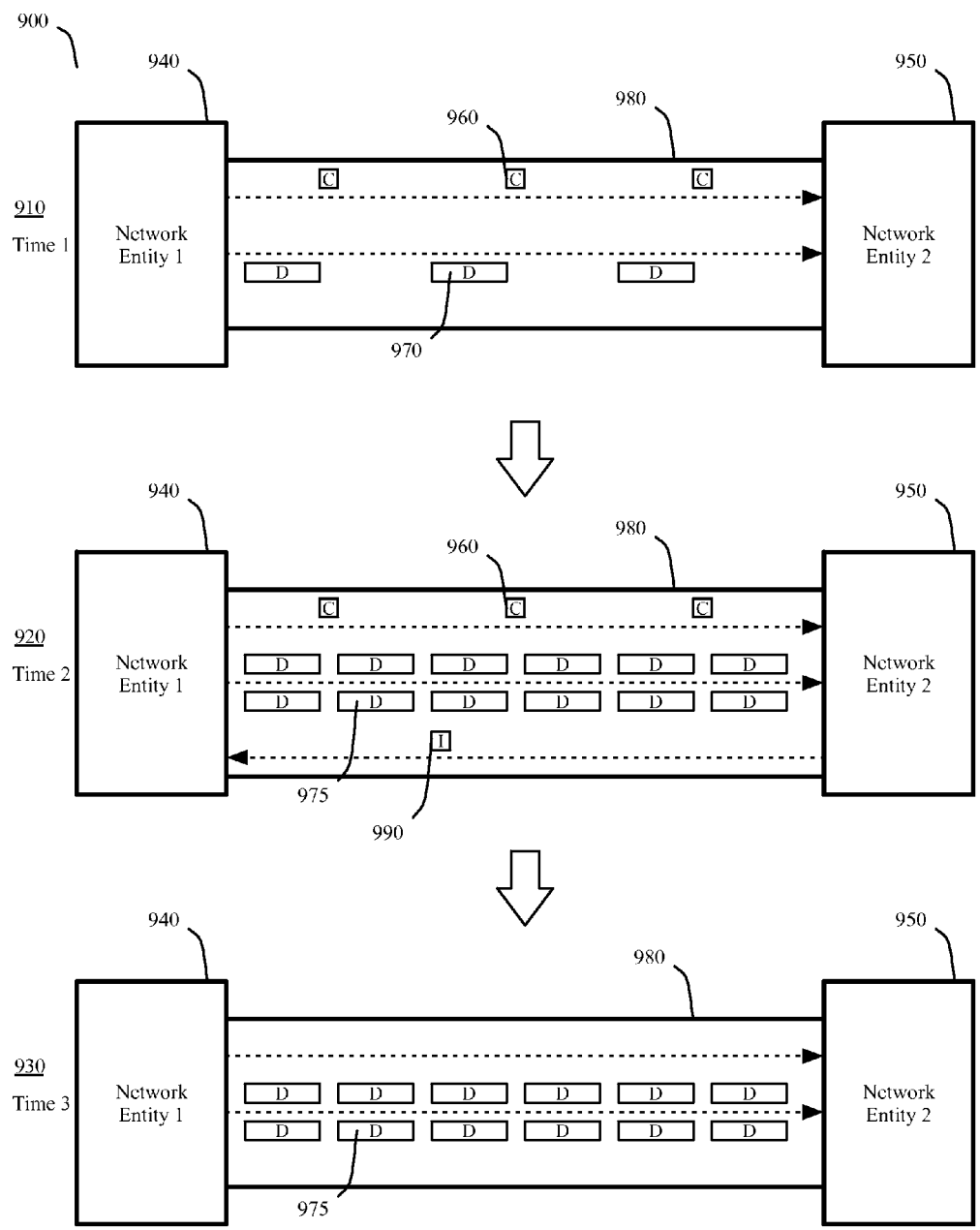
FIG. 9 conceptually illustrates an example BFD Session of some embodiments where control transmission is stopped when a link has high traffic.

FIG. 9 conceptually illustrates an example BFD Session 900 where a BFD Processor of some embodiments stops transmitting control packets when there is an increased amount of data traffic being transmitted on link 980. BFD Session 900 is shown at three times 910, 920, and 930. Times 910, 920, and 930 are conceptual time captures that illustrate rates of packet transmission as discrete quantities of packets for ease of presentation.

The first time 910 illustrates network entity 940 transmitting control packets at rate 960 and data packets at rate 970 to network entity 950 over link 980. Control packets at rate 960 are being sent at an initial default frequency at the first time 910. Different embodiments of the invention may use different initial default frequencies.

The second time 920 illustrates network entity 940 transmitting control packets at the same rate 960 as time 910 and data packets at an increased rate 975 to network entity 950 over link 980. Increased data packet rate 975 of the second time 920 transmits more data packets than that of data packet rate 970 of the first time 910. The increased data packet rate 975 now indicates that the link 980 is being heavily utilized as it is now transmitting significantly more traffic from network entity 940 to network entity 950. Due to the significant traffic, the BFD Processor of some embodiments terminates sending control packets because these packets are redundant. By terminating the transmission of control packets, the network is able to produce a substantial savings of network resource usage, especially when this type of savings is applied to many links over a densely linked network. In order to terminate the transmission of control packets, the BFD Processor instructs network entity 950 to transmit a communication 990 over link 980 to instruct network entity 940 to stop transmitting control packets. In some embodiments the communication 990 is a network packet. The third time 930 illustrates network entity 940 transmitting data packets at increased rate 975 to network entity 950 over link 980 without sending any control packets.

Figure 10:
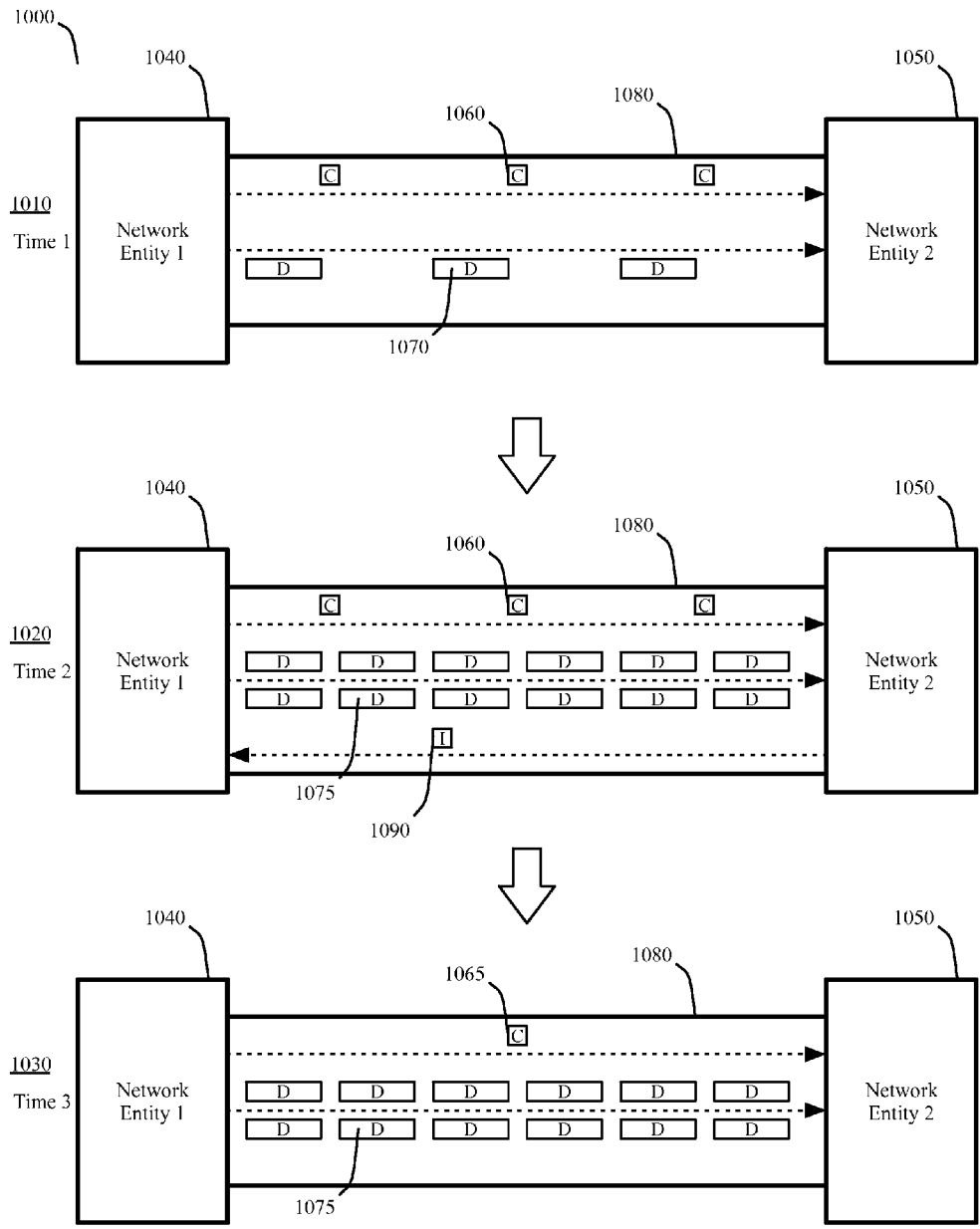
FIG. 10 conceptually illustrates an example BFD Session of some embodiments where control packet frequency is reduced when a link has high traffic.

FIG. 10 conceptually illustrates an example BFD Session 1000 where a BFD Processor of some embodiments decreases, without going to a zero rate, control packet frequency when there is an increased amount of traffic being transmitted on link 1080. BFD Session 1000 is shown at three times 1010, 1020, and 1030. Times 1010, 1020, and 1030 are conceptual time captures that illustrate rates of packet transmission as discrete quantities of packets for ease of presentation.

The first time 1010 illustrates network entity 1040 transmitting control packets at rate 1060 and data packets at initial rate 1070 to network entity 1050 over link 1080. Control packets at rate 1060 are being sent at an initial default frequency at the first time 1010. Different embodiments of the invention may use different initial default frequencies.

The second time 1020 illustrates network entity 1040 transmitting control packets at rate 1060 and data packets at increased rate 1075 to network entity 1050 over link 1080. Increased data packet rate 1075 of the second time 1020 transmits more data packets than that of initial data packet rate 1070 of the first time 1010. The increased data packet rate 1075 indicates that the link 1080 is being heavily utilized as it is now transmitting significantly more traffic from network entity 1040 to network entity 1050 as compared to time 1010. As such, the BFD Processor of some embodiments reduces the rate of control packets being sent on BFD Session 1000 because of its high data traffic rate, which renders the control packets redundant considering the significant flow of data traffic. Such control packet frequency reductions can produce substantial savings of unnecessary network resource usage when applied to many links over a densely linked network. In order to reduce a control packet frequency, the BFD Processor instructs network entity 1050 to transmit an instruction 1090 over link 1080 to instruct network entity 1040 to transmit control packets at a reduced frequency. In some embodiments the instruction is contained within a network packet.

In some embodiments, a threshold level of data packet transmission is provided to help determine when to modify a control packet rate. Once data packet transmission rates exceed the threshold level, the BFD Processor of some embodiments reduces control packet frequencies. In some embodiments the threshold level of data transmission for a particular link is computed as a multiple of a minimum transmission rate for the particular link (e.g. the minimum transmission rate is one packet per minute and the threshold level for control packet frequency reduction is thirty thousand packets per minute).

The third time 1030 illustrates network entity 1040 transmitting control packets at reduced rate 1065 and data packets at that same increased rate 1075 to network entity 1050 over link 1080 compared to time 1020. The reduced rate of control packets 1065 allows for less usage of bandwidth and processing resources and avoids waste when verifying a high traffic connection from network entity 1040 to network entity 1050. In some embodiments, only two rates of control packets are available, the initial default rate corresponding to rate control packets 1060, and a reduced rate corresponding to reduced rate of control packets 1065. In some embodiments, the reduced rate of control packets 1065 scales variably based on the rate of data packets. In some embodiments, a floor for the rate of control packets is provided. In yet other embodiments, such as those described in connection with FIG. 9, the BFD Processor simply terminates all transmission of control packets when data traffic is sufficiently heavy.

Figure 11:
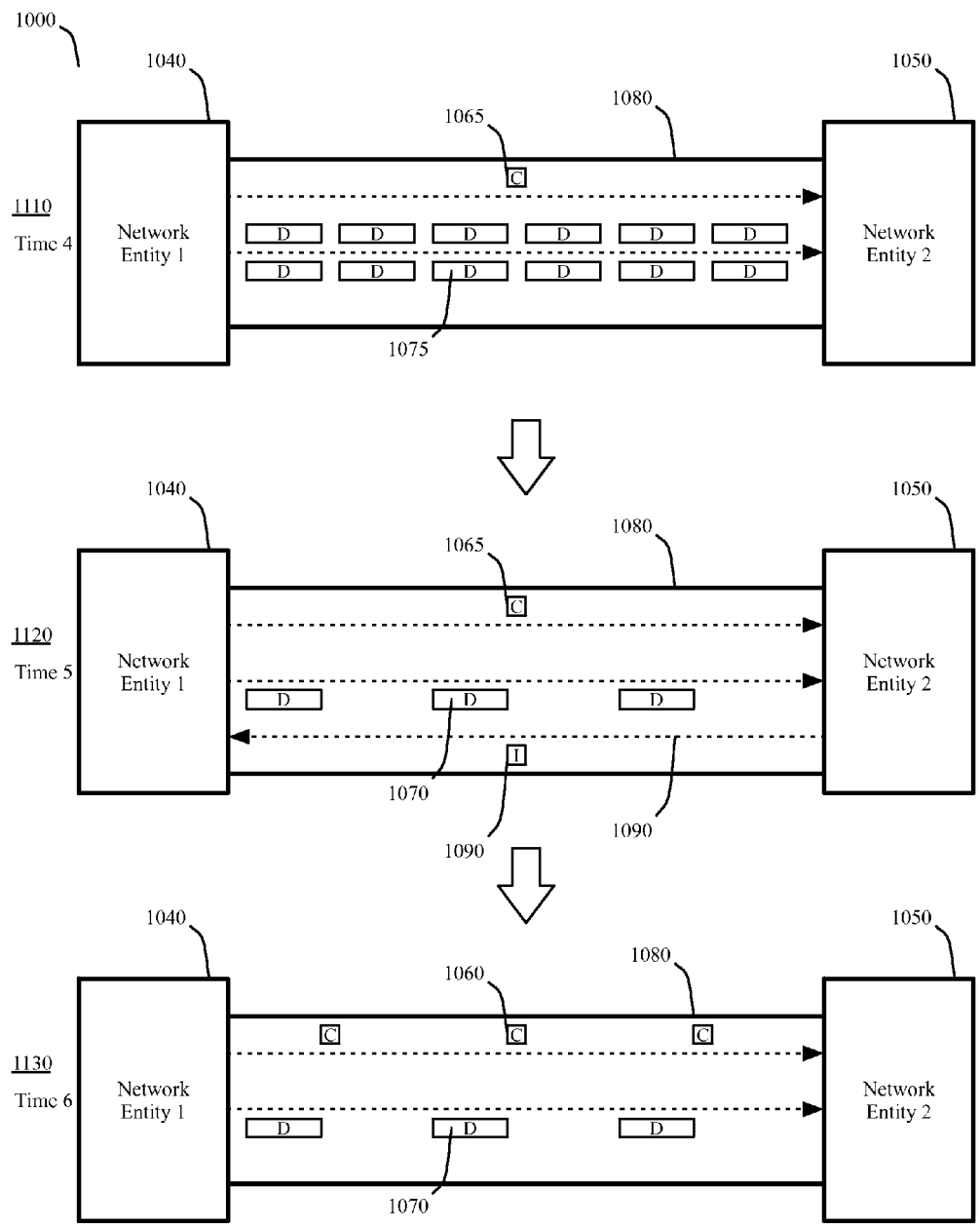
FIG. 11 conceptually illustrates an example BFD Session of some embodiments where control packet frequency is increased when data traffic falls to a normal rate.

FIG. 11 conceptually illustrates the example BFD Session 1000 from FIG. 10 after the BFD Processor has reduced the rate of control packets from network entity 1040 to network entity 1050. In FIG. 11, the BFD Processor increases control packet transmission rates as data traffic reverts back to a normal transmission rate on link 1080. BFD Session 1000 is shown at three times 1110, 1120, and 1130. Times 1110, 1120, and 1130 are conceptual time captures that illustrate rates of packet transmission as discrete quantities of packets for ease of presentation.

The fourth time 1110 illustrates network entity 1040 transmitting control packets at reduced rate 1065 and data packets at increased rate 1075 to network entity 1050 over link 1080. The fifth time 1120 illustrates network entity 1040 transmitting control packets at the same reduced rate 1065 and data packets at again the decreased initial rate 1070 to network entity 1050 over link 1080. Accordingly, the BFD Processor of some embodiments increases the rate of control packets being sent on BFD Session 1000 because of the decrease in data packet transmission to the initial rate 1070. In order to adjust the control packet frequency adjustment, network entity 1050 transmits a communication 1090 over link 1080 to instruct network entity 1040 to transmit control packets at the initial rate 1060. The sixth time 1130 illustrates network entity 1040 now transmitting control packets at the higher initial rate 1060 and data packets at the same initial rate 1070 to network entity 1050 over link 1080. In some embodiments, network entity 1050 instructs network entity 1040 to transmit control packets at an increased rate, not the initial rate 1060.

Figure 12:
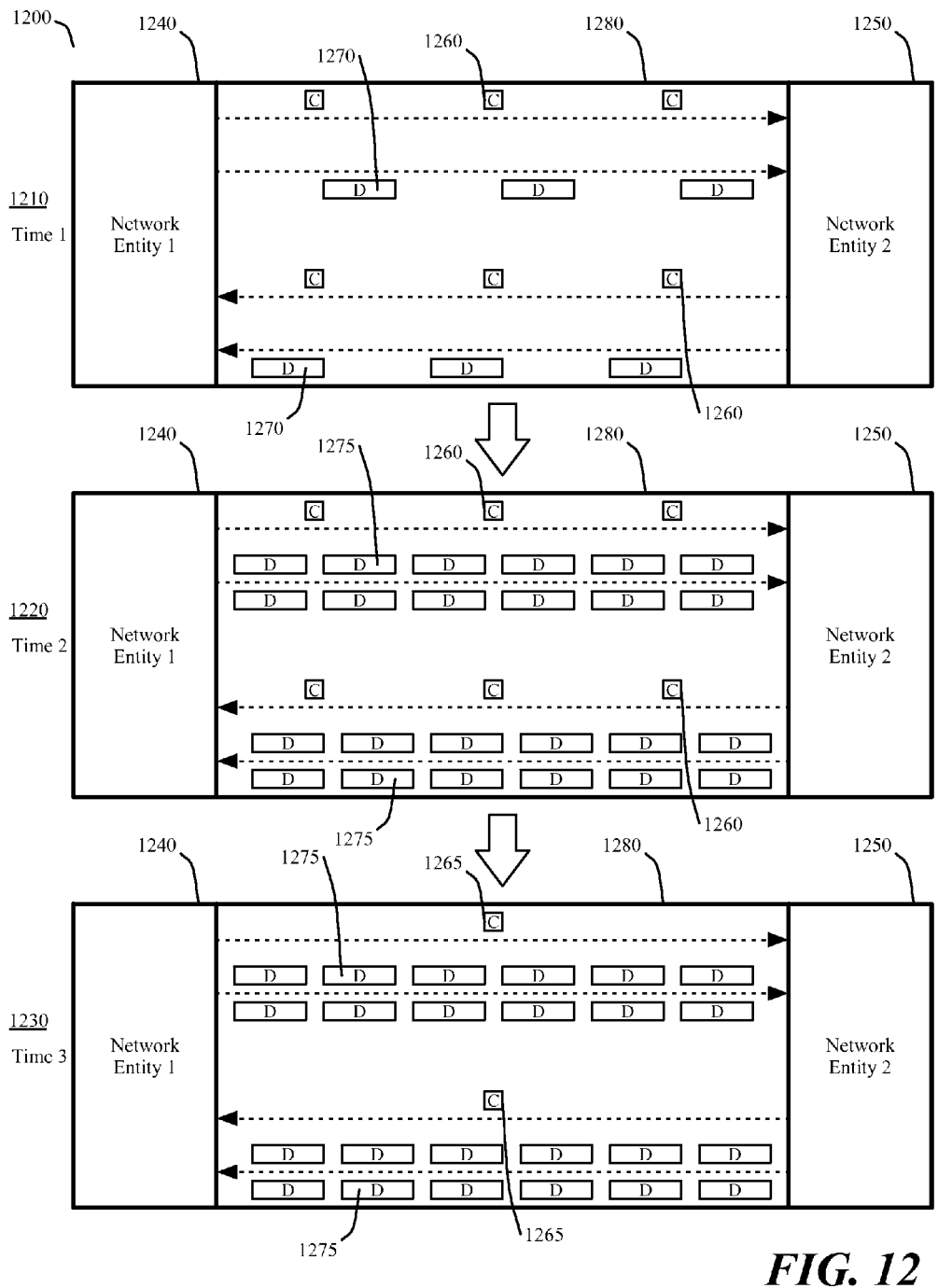
FIG. 12 conceptually illustrates an example BFD Session of some embodiments where control packet frequency is reduced in both directions.

Link 1080 is illustrated with control packets and data packets only being sent from network entity 1040 to network entity 1050; however link 1080 is a bi-directional link as indicated by the communication 1090. As discussed above, BFD Sessions are typically only set up on bi-directional links with data going in both directions. FIG. 12 conceptually illustrates an example BFD Session 1200 where a BFD Processor of some embodiments reduces control packet frequency in both directions when there is an increased amount of data traffic being transmitted in both directions on link 1280. BFD Session 1200 is shown at three times 1210, 1220, and 1230. Times 1210, 1220, and 1230 are conceptual time captures that illustrate rates of packet transmission as discrete quantities of packets for ease of presentation.

The first time 1210 illustrates network entity 1240 transmitting control packets at rate 1260 and data packets at rate 1270 to network entity 1250 over link 1280. Additionally, first time 1210 illustrates network entity 1250 transmitting control packets at rate 1260 and data packets at rate 1270 to network entity 1240 over link 1280. Control packets at rate 1260 are being sent at an initial default frequency at the first time 1210.

The second time 1220 illustrates both network entities 1240 and 1250 transmitting control packets at the same rate 1260 as in time 1210, but data packets at an increased traffic rate 1275. Increased traffic rate 1275 of the second time 1220 transmits significantly more data packets than that of data packet rate 1270 of the first time 1210. Accordingly, the BFD Processor of some embodiments reduces the rate of control packets being sent on BFD Session 1200 due to the redundancy of transmitting control packets in addition to increased traffic rate 1275. In order to reduce a control packet frequency, the BFD Processor directs both network entities 1240 and 1250 to instruct each other to transmit control packets at a reduced frequency. In some embodiments, the instructions are transmitted as information encoded within the control packets themselves.

The third time 1230 illustrates both network entities 1240 and 1250 transmitting control packets at reduced rate 1265 and data packets at increased traffic rate 1275. The reduced rate of control packets 1265 allows for less bandwidth and processing resources to be wasted when verifying a high traffic connection between network entities 1240 and 1250. In some embodiments, only two rates of control packets are available, the initial default rate corresponding to rate control packets 1260, and a reduced rate corresponding to reduced rate of control packets 1265. In some embodiments, the reduced rate of control packets 1265 scales variably based on the rate of data packets. In yet other embodiments, such as those described in connection with FIG. 9, the BFD Processor simply terminates all transmission of control packets when data traffic is sufficiently heavy.

Figure 13:
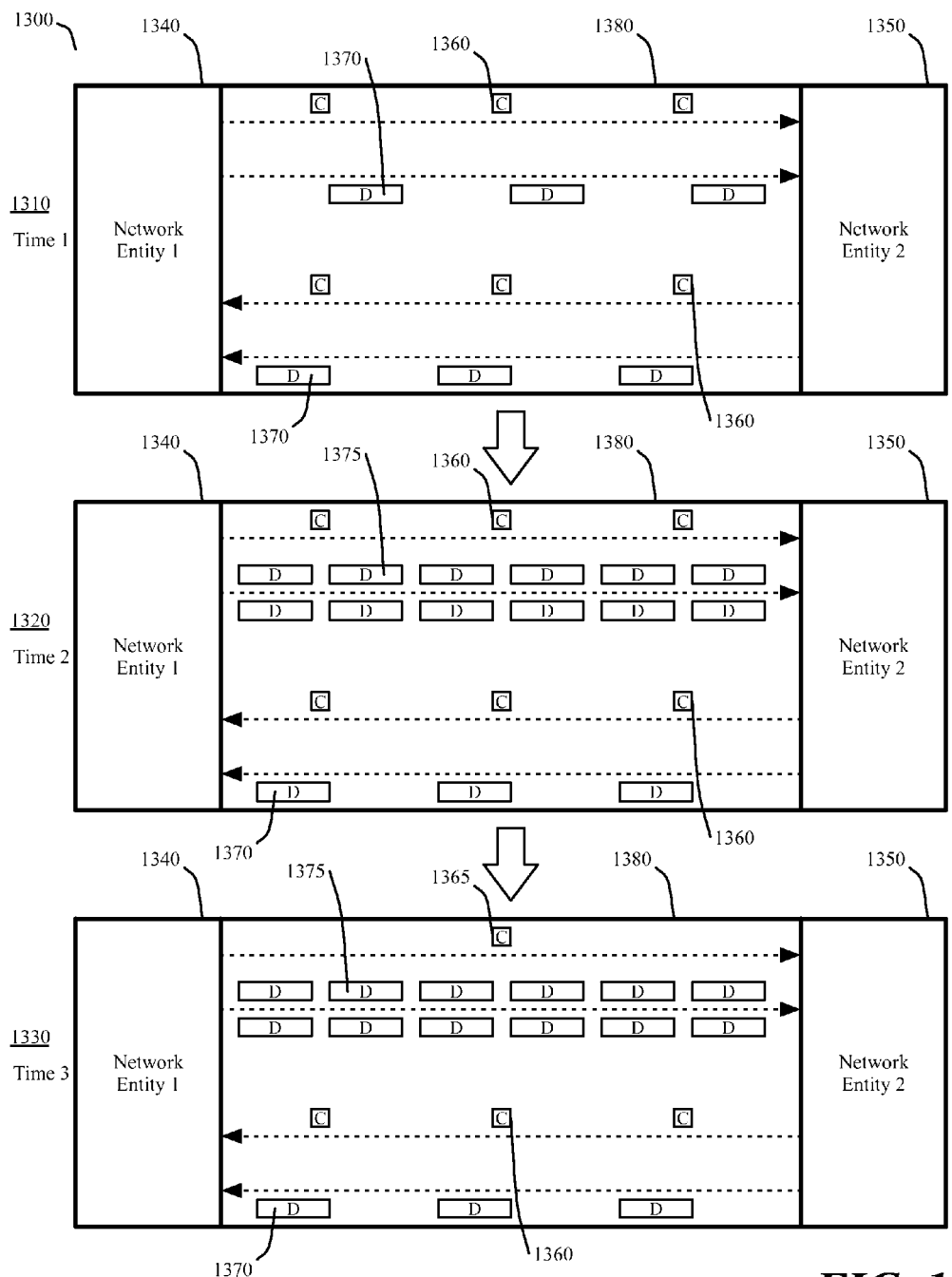
FIG. 13 conceptually illustrates an example BFD Session of some embodiments where control packet frequency is reduced in one direction but not the other.

As discussed above, link 1280 is a bi-directional link with control and data packets being passed in both directions. Links regularly transmit data packets at different rates, and the BFD Processor of some embodiments manages control packets at corresponding different rates. FIG. 13 conceptually illustrates an example BFD Session 1300 where a BFD Processor of some embodiments reduces control packet frequency in one direction on a link without reducing the control packet frequency on the other direction on the link. BFD Session 1300 is shown at three times 1310, 1320, and 1330. Times 1310, 1320, and 1330 are conceptual time captures that illustrate rates of packet transmission as discrete quantities of packets for ease of presentation.

The first time 1310 illustrates network entity 1340 transmitting control packets at rate 1360 and data packets at rate 1370 to network entity 1350 over link 1380. Additionally, first time 1310 illustrates network entity 1350 transmitting control packets at rate 1360 and data packets at rate 1370 to network entity 1340 over link 1380. Control packets at rate 1360 are being sent at an initial default frequency at the first time 1310.

The second time 1320 illustrates both network entities 1340 and 1350 transmitting control packets at rate 1360. However, data packets are being transmitted from network entity 1340 to network entity 1350 at an increased traffic rate 1375. Whereas data packets are being transmitted from network entity 1350 to network entity 1340 at a relatively lower data rate 1370. As mentioned above, the rates of data transmission can be different over bi-directional links. The BFD Processor of some embodiments can regulate control packet rates independently in each direction on a bi-directional link. In order to reduce a control packet frequency, the BFD Processor directs network entity 1350 to instruct network entity 1340 to send control packets at a reduced frequency. In some embodiments, the instructions are transmitted as information encoded within the control packets themselves.

The third time 1330 illustrates network entity 1350 transmitting control packets at initial rate 1360 and data packets at rate 1370. However, network entity 1340 is transmitting control packets at reduced rate 1365 and data packets at increased traffic rate 1375. The reduced rate of control packets 1365 allows for less wasted network resources used on redundant control packets without affecting traffic in the other direction.

Figure 14:
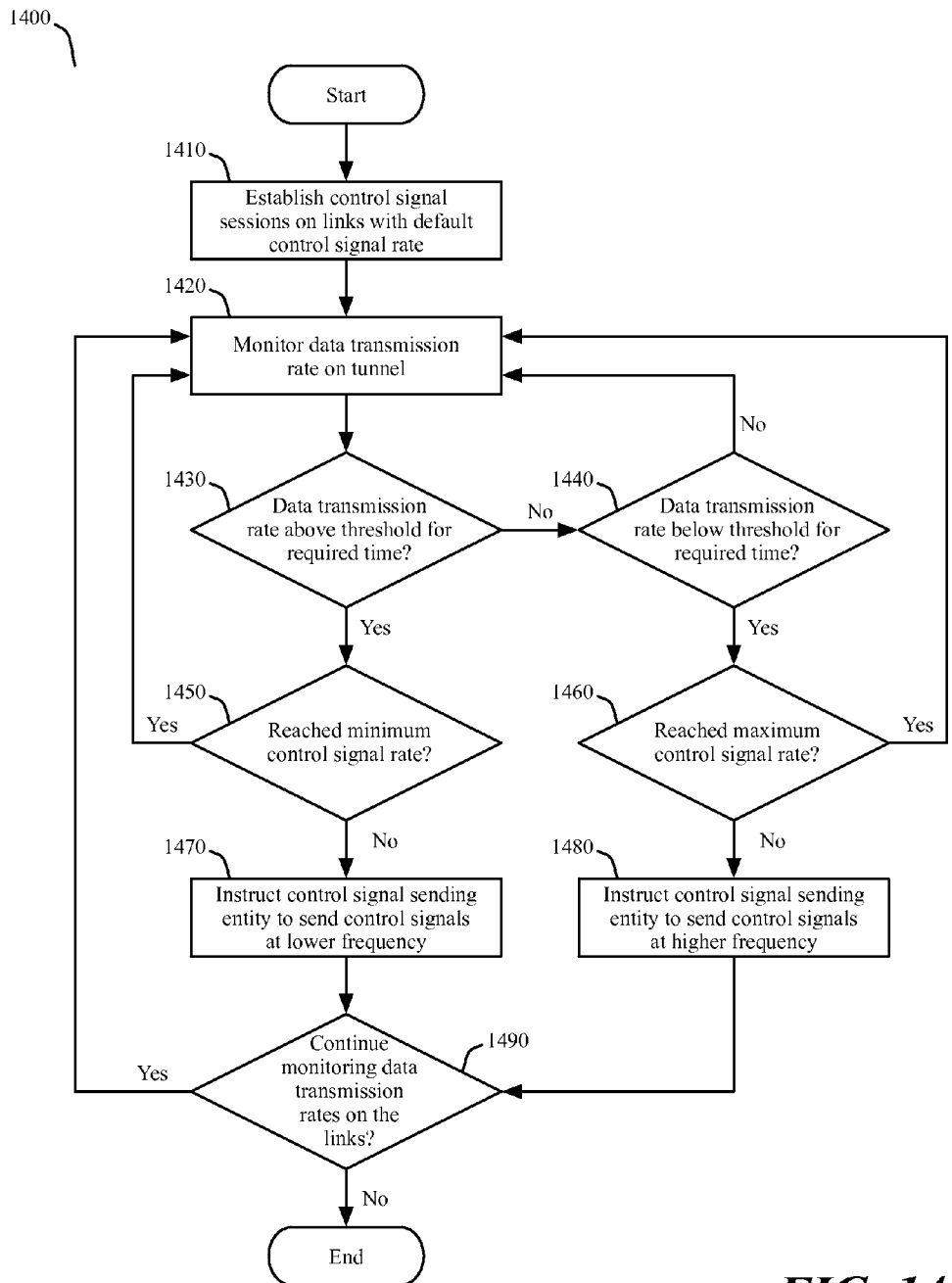
FIG. 14 conceptually illustrates a process of some embodiments for managing a rate of control packets over a link.

Having described several examples of the BFD Processor adjusting control packet frequencies in FIGS. 9-13, specific operations and feedback controls will now be described in conjunction with FIG. 14. FIG. 14 conceptually illustrates a process 1400 that some embodiments of the invention perform to dynamically manage multiple control signal sessions. In some embodiments, a control signal processor running on a network entity performs the process 1400. In some embodiments, the process 1400 is performed by different applications for managing control signals. Examples of these different applications include: a BFD Processor, an OVS Instance, or a BFD Processor running as a module of an OVS Instance.

Initially, the process 1400 establishes (at 1410) control signal sessions on links with default control signal rates. The initial default frequency for control signals may vary in different embodiments of the invention. For instance, the default control signal rate can be between transmitting a control packet once every 100 milliseconds to once every 10,000 milliseconds. Some embodiments can have control signal rates beyond those enumerated here. The process 1400 then monitors (at 1420) data transmission rates on the links with established control signal sessions. As in the example shown in FIGS. 12 and 13, the control signal processor can independently regulate control signal frequencies of bi-directional links in both directions.

The process 1400 determines (at 1430) whether a data transmission rate has exceeded a threshold for a required period of time. The process makes determination 1430 in order to determine whether a data transmission rate has risen to a level that could potentially require a decrease in control signal frequency, as in the example shown in FIG. 10. When a data transmission rate has exceeded a threshold for a required period of time, the process 1400 determines (at 1450) whether the control signal rate on the threshold-exceeding link has reached a minimum control signal rate. Different embodiments use different threshold rates and different required times. For instance, in some embodiments the threshold rate is computed as a multiple of a minimum transmission rate for the particular link (e.g. the minimum transmission rate is one data packet per minute and the threshold level for control packet frequency reduction is three hundred data packets per minute). In some embodiments, the required time period can range from 2000 to 4000 milliseconds of data traffic above the threshold level. One of ordinary skill in the art will realize that other time thresholds are possible in different embodiments of the invention.

When the threshold exceeding links are already at their minimum control signal frequency, the process returns to monitor (at 1420) the data transmission rate on the links. In some embodiments, the minimum control signal frequency is a rate of zero control signals as shown in the example in FIG. 9. When a threshold-exceeding link has not reached its minimum control signal rate, the process 1400 instructs (at 1470) the control signal sending entity to send control signals at a lower frequency, as in the example shown in FIG. 10. The control signal processor of some embodiments is running as an instance on several network entities in a network. In such embodiments, the control signal processor instance running on the control signal receiving entity instructs the control signal sending entity to decrease the rate of control signals being sent.

Returning to determination 1430 discussed above, when no data transmission rate has exceeded a threshold for a required period of time, the process 1400 determines (at 1440) whether any data transmission rates have fallen below a threshold for a required period of time. The process makes determination 1440 in order to determine whether a data transmission rate has fallen to a level that could potentially require an increase in control signal frequency, as in the example shown in FIG. 11. In some embodiments, the required period of time for the data transmission rate to be below the threshold at 1440 is different than that required at 1430.

When a data transmission rate has fallen below the threshold for the required period of time, the process 1400 determines (at 1460) whether the control signal rate on the sub-threshold link has reached a maximum control signal rate. When either no data transmission rate is below the required threshold or when the threshold-passing links are already at their maximum control signal frequency, the process returns to monitoring (at 1420) the data transmission rate on the links. When a sub-threshold link has not reached its maximum control signal rate, the process 1400 instructs (at 1480) the control signal sending entity to send control signals at a higher frequency, as in the example shown in FIG. 11. The control signal processor of some embodiments is running as an instance on several network entities in a network. In such embodiments, the control signal processor instance running on the control signal receiving entity instructs the control signal sending entity to increase the rate of control signals being sent.

After either instructing a control signal sending entity to send control signals at a lower frequency (at 1470) or instructing a control signal sending entity to send control signals at a higher frequency (at 1480), the process 1400 determines (1490) whether to continue monitoring data transmission rates on the links on which control signal sessions have been established. Should the process choose to cease monitoring the data transmission rates, the process 1400 ends. Otherwise the process returns to monitoring data transmission rates on the links on which control signal sessions have been established (at 1420). Having described adjusting control signal rates in both low and high traffic situations, an actual implementation of the a control signal processor will be described in the next section.

IV. Implementation on Managed Network Entities

The following section describes embodiments of the invention implemented on an example network entity. As discussed above, the invention can be implemented on a wide variety of network entities. While the forthcoming example is discussed in terms of an implementation using Open Virtual Switch software (hereinafter "OVS"), some embodiments of the invention can be implemented on other network entity control applications.

Figure 15:
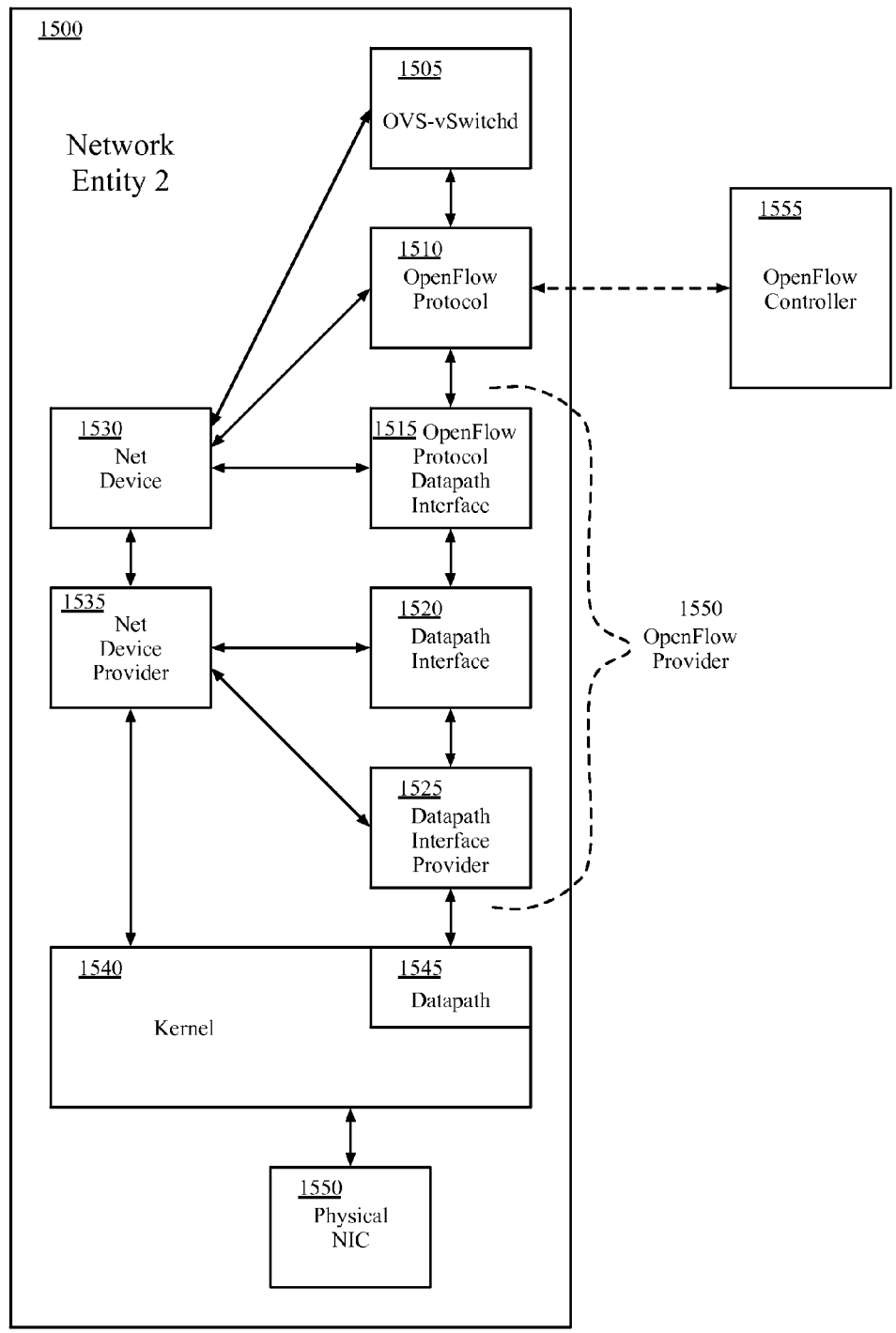
FIG. 15 conceptually illustrates an architectural diagram of a network entity of some embodiments.

FIG. 15 conceptually illustrates an architectural diagram of network entity 1500. Network entity 1500 includes a number of software modules conceptually represented as connected rectangles. These connections represent lines of software communication between the various software modules being run on Network Entity 1500.

OVS vSwitchd 1505 is daemon that implements a virtual switch on network entity 1500. OVS vSwitchd 1505 routes network traffic between network entities. In some embodiments, OVS vSwitchd 1505 controls network traffic between virtual machines running on network entity 1500. In some embodiments, OVS vSwitchd 1505 is executed by an embedded central processing unit (CPU) on network entity 1500. In embodiments where network entity 1500 is a virtual software element, OVS vSwitchd 1505 is executed as a software process.

OpenFlow Protocol 1510 is an Application Programming Interface (hereinafter "API") for OVS vSwitchd 1505 to use in accessing OpenFlow Protocol Datapath Interface 1515. OpenFlow Protocol 1510 implements OpenFlow on network entity 1500. OpenFlow Protocol 1510 is one of many possible switching control protocols with which the invention of some embodiments can be implemented. OpenFlow Protocol 1510, in some embodiments, is a communication protocol for controlling the forwarding plane (e.g., forwarding tables) of a network entity. For instance, the OpenFlow Protocol 1510 provides commands for adding flow entries to, removing flow entries from, and modifying flow entries in forwarding tables associated with network entity 1500. The forwarding plane is implemented on Datapath 1545 as a series of look up tables.

In some embodiments, OpenFlow Controller 1555 can transmit data to OpenFlow Protocol 1510 in order to modify the behavior of OVS vSwitchd 1505. In some embodiments, OpenFlow Protocol 1510 contacts OpenFlow Controller 1555 to receive a state of OpenFlow Provider 1550 to implement on network entity 1500. OpenFlow Protocol Datapath Interface 1515, Datapath Interface 1520, and Datapath Interface Provider 1525 modules together comprise an implementation of OpenFlow Provider 1550 on network entity 1500. OpenFlow Provider 1550 implements OpenFlow Protocol 1510 on network entity 1500.

OpenFlow Protocol Datapath Interface 1515 is the controlling module of OpenFlow Provider 1550. In some embodiments, the BFD Processor is implemented as a component of OpenFlow Protocol Datapath Interface 1515. Thus, OpenFlow Protocol Datapath Interface 1515 is the module responsible for regulating the connection validating control signals of some embodiments in response to fluctuations in network traffic as measured by Kernel 1540, and as recorded by Net Device 1530. The OpenFlow Protocol Datapath Interface 1515 queries Net Device 1530 to determine current network traffic rates over connections to network entity 1500. As will be discussed below in more detail, Network Device 1530 maintains counters storing network traffic rates over the connections to network entity 1500. In some embodiments, OpenFlow Protocol Datapath Interface 1515 regularly queries Net Device 1530 as part of a run time loop. As discussed above in connection with FIGS. 8 and 14, when network traffic crosses certain thresholds for certain periods of time, the OpenFlow Protocol Datapath Interface 1515 requests that other network entities reduce or increase the rates at which they transmit control packets. In some embodiments, the OpenFlow Protocol Datapath Interface 1515 adjusts its own rate at which it transmits control packets if certain network traffic conditions are met.

Datapath Interface 1520 provides an API to allow OpenFlow Protocol Datapath Interface 1515 to configure Datapath 1545. Through Datapath Interface 1520, OpenFlow Protocol Datapath Interface 1515 can transmit instructions to populate forwarding tables of the Datapath 1545 with rules on how to handle incoming and outgoing network traffic (e.g. packets). In addition, the OpenFlow Protocol Datapath Interface 1515 can request information about and from the Datapath 1545 using Datapath Interface 1520. In some embodiments, the OpenFlow Protocol Datapath Interface 1515 can direct how specific packets are forwarded using Datapath Interface 1520. Datapath Interface 1520 is implemented on network entity 1500 using Datapath Interface 1520. Datapath Interface Provider 1525 is a platform specific implementation of Datapath Interface 1520. The platforms on which some embodiments of the invention can be implemented include: Linux, ESX, and other comparable networking Kernels. In addition, Datapath Interface Provider 1525 transmits messages as required to implement the Datapath Interface 1520 API.

Net Device 1530 is a software module of OVS vSwitchd 1505 running on network entity 1500. Net Device 1530 pulls network traffic statistics from Kernel 1540. In some embodiments, Net Device 1530 keeps several counters storing various network statistics, such as the number of packets certain links have transmitted. The Net Device 1530 increments these counters based on information retrieved from Kernel 1540. In some embodiments, the other modules 1505-1525 may query Net Device 1530 for currently stored statistics. When queried, Net Device 1530 provides the requesting module with the queries statistics as stored in its counters. Net Device 1530 is conceptually illustrated as connected to modules 1505, 1510, and 1515 to demonstrate this querying functionality.

Net Device 1530 accesses Kernel 1540 through Net Device Provider 1535. Net Device Provider 1535 is an API similar to the other API's discussed in this section. Net Device Provider 1535 implements Net Device 1530 on the specific Kernel being used on network entity 1500. Net Device Provider 1535 can communicate with Datapath Interface 1520 and Datapath Interface Provider 1525.

Kernel 1540 is a companion Linux Kernel to OVS vSwitchd 1505. Kernel 1540 enables flow based switching on network entity 1500. Kernel 1540 control Datapath 1545 and communicates with Physical NIC 1550. Kernel 1540 maintains statistics for all traffic across any links for network entity 1500. Kernel 1540 responds to Datapath Interface Provide 1525 as requested.

In some embodiments, the Datapath 1545 includes a set of forwarding tables that contain flow entries that indicate how to handle incoming and outgoing packets to the network entity 1500. The forwarding tables are implemented as look up tables that match packets to flow entries. Flow entries contain a set of packet fields to match, and an action (such as send-out-port, modify-field, or drop). The Datapath 1545 is populated with flow entries via the operations of modules 1505-1525 and Kernel 1540. When a packet does not match any flow entries in Datapath 1545, the packet is sent to OVS-vSwitchd 1505 to make a decision how to handle the packet. In some embodiments, upon making such a decision with an unmatched packet, the OVS-vSwitchd 1505 directs the OpenFlow Protocol Datapath Interface 1515 to populate the Datapath 1545 with appropriate new flow entries to handle the previously unmatched packet, and future packets that match the new flow entries.

Physical NIC 1550 (Network Interface Controller) is a physical hardware component that connects network entity 1500 to a network. The Physical NIC 1550 transmits network traffic according to the flow entries stored in the forwarding table of Datapath 1545. In some embodiments, Datapath 1545 is implemented as a hardware component of the Physical NIC 1550. As a piece of hardware circuitry, the Physical NIC 1550 can include many different types of connection, links, and ports. Some connections on the Physical NIC 1550 are physical connections such as Ethernet cables. Other connections can be links or tunnels across network wires. In some embodiments, the Physical NIC 1550 is a virtual NIC running as a VM on a physical host and the Physical NIC 1550 has virtual interfaces to a virtual network. In various network environments, the Physical NIC 1550 will be different dependent on the nature of the network entity 1500.

Figure 16:
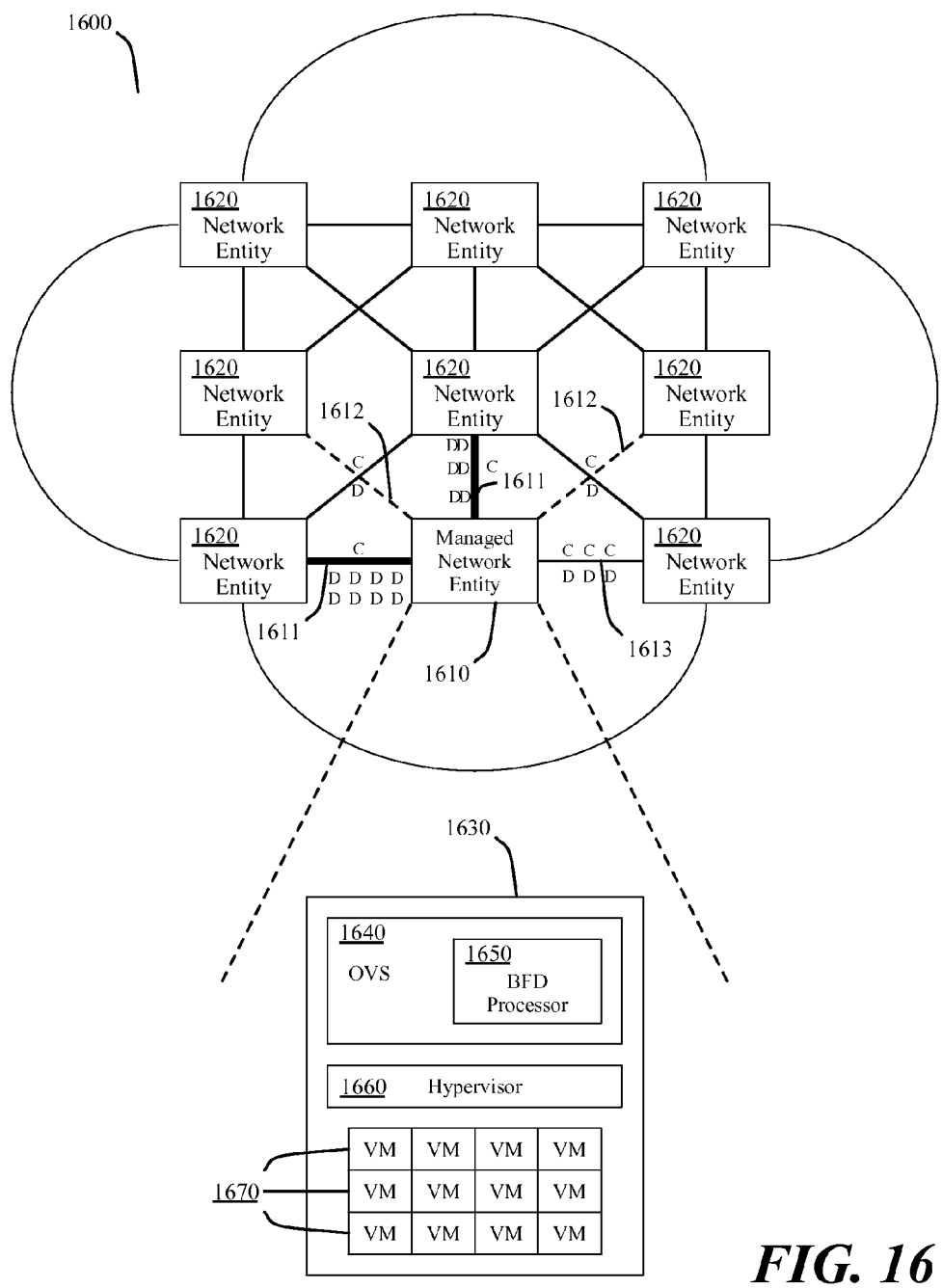
FIG. 16 conceptually illustrates a dense network with a managed network entity of some embodiments.

FIG. 16 conceptually illustrates a network 1600 with a dense mesh of links between various different network entities 1620 and managed network entity 1610. Network 1600 is a network similar to that of network 300 shown in FIG. 3, however, managed network entity 1610 of FIG. 16 is running a BFD Processor according to some embodiments of the invention. Combinations of heavy and light network traffic are running towards managed network entity 1610. However, managed network entity 1610 has a reduced workload thanks to BFD Processor 1650.

As shown in FIG. 16, the links between high traffic network entity 1610 and network entities 1620 are conceptually illustrated with series of "C" and "D" packets streaming over bolded links 1611, dashed links 1612, and a solid link 1613. The bolded links 1611 show heavy amounts of "D" data and a reduced rate of "C" control packets after adjustments made by BFD Processor 1650. The dashed links 1612 show light amounts of "D" data and a reduced rate of "C" control packets after adjustments made by BFD Processor 1650. The solid link 1613 shows average amounts of "D" data and a default rate of "C" control packets that remain unadjusted by BFD Processor 1650. Thanks to these adjustments, managed network entity 1610 is not wasting valuable network resources or excess processing cycles transmitting and processing control packets on redundant or lower priority connections.

As shown in network expanded view 1630, network resources are at a premium because managed network entity 1610 is running OVS 1640, hypervisor 1660, and virtual machines 1670. Each of OVS 1640, hypervisor 1660, and virtual machines 1670 could have links (e.g. tunnels) established with other network entities. In this example, if the virtual machines 1670 each have links to each other virtual machine on network entities 1620, then the number of BFD Sessions to run over a fully meshed network of virtual machine links scales at a rate of $[N*(N-1)]/2$ where N equals the number of virtual machines on network 1600.

However, as shown in expanded view 1630, network entity 1610 is running BFD Processor 1650 as a sub-component of OVS 1640. Unlike network 300 shown in FIG. 3, network 1600 of FIG. 16 is running smoothly with only an essential amount of control packets being transmitted over the network.

Figure 17:
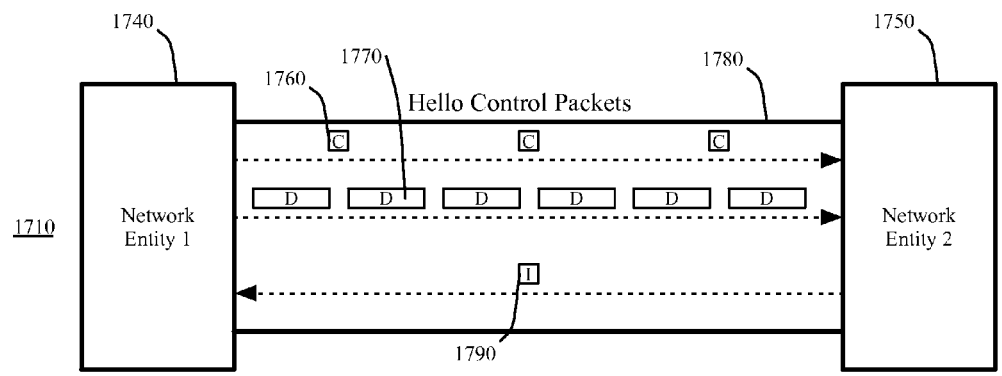
FIG. 17 conceptually illustrates two examples of different methods of transmitting control packets of some embodiments.
Figure 17:
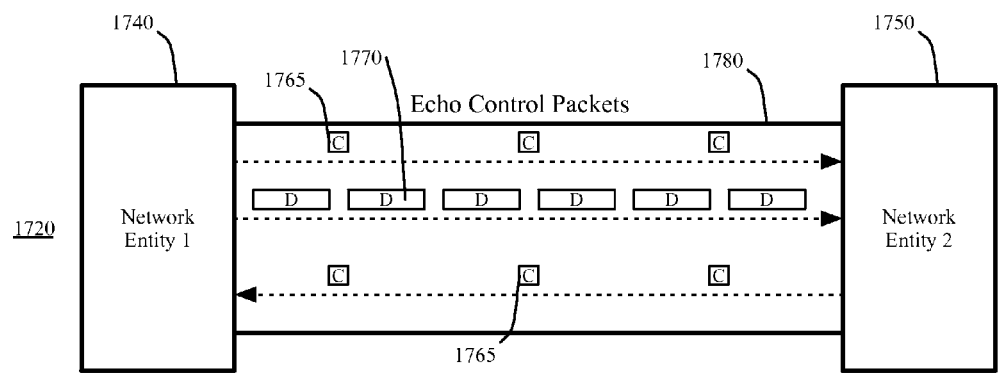

FIG. 17 conceptually illustrates two examples 1710 and 1720 of different methods of transmitting control packets from network entity 1740 to network entity 1750 over a bidirectional link 1780. In example 1710, network entity 1740 is transmitting data packets 1770 and hello control packets 1760 over link 1780 to network entity 1750. Hello control packets 1760 are unidirectional packets with no encoded instructions directing their recipient to return them to their sender. In embodiments that use hello control packets, the recipient of such hello control packets will have to send instructions back to the sender of the hello control packets in order to instruct the hello control packet sender to reduce the transmission rate of hello control packets. In example 1710, network entity 1750 is transmitting a communication 1790 back to network entity 1740. In embodiments of the invention that use hello control packets, separate transmissions of information are necessary to adjust control packet transmission rates. In embodiments where a BFD session is established in both directions on a bi-directional link and where hello control packets are used in both direction, transmissions of information indicating that a change should be made to hello control packet transmission rates can be sent as a part of the opposite direction's hello control packet stream.

In example 1720, network entity 1740 is transmitting data packets 1770 and echo control packets 1765 over link 1780 to network entity 1750. As shown in example 1720, network entity 1750 is also transmitting echo control packets 1765 back to network entity 1740. Because echo control packets 1765 are returned back to their sender, network entity 1740 no longer needs to coordinate with network entity 1750 in to determine whether network entity 1750 remains functional. In the case that echo control packets are used, network entity 1740 can unilaterally adjust the rate at which it sends echo control packets unilaterally without separate instructions back and forth to network entity 1750 because network entity 1750 mirrors echo control packets back towards network entity 1740.

V. Electronic System

Figure 18:
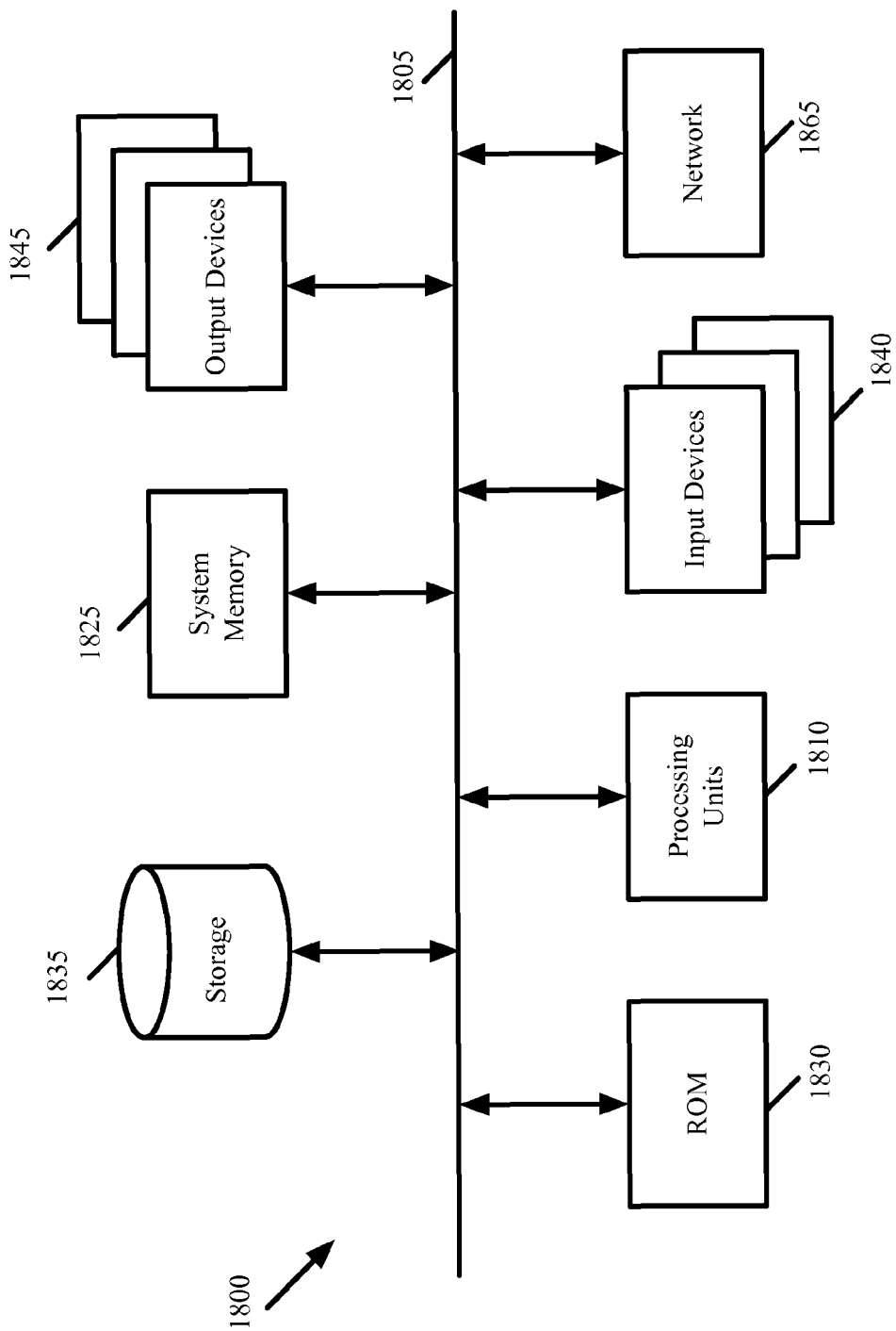
FIG. 18 conceptually illustrates an electronic system with which some embodiments of the invention are implemented.

FIG. 18 conceptually illustrates an electronic system 1800 with which some embodiments of the invention are implemented. The electronic system 1800 can be used to execute any of the control, virtualization, or operating system applications described above. The electronic system 1800 is a computer (e.g., a network entity, a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1825, and the permanent storage device 1835.

From these various memory units, the processing unit(s) 1810 retrieve instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. From these various memory units, the processing unit(s) 1810 retrieve instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples electronic system 1800 to a network 1865 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 8, and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method for regulating transmission of control signals in a network, the network comprising a link connecting first and second network entities, the method comprising:
   at the first network entity, establishing a control signal session on the link with the second network entity, wherein the first network entity receives control signals at an initial rate from the second network entity;
   monitoring a rate of data signal transmission over the link, wherein the data signals are separate signals from the control signals; and
   when the monitored rate of data signal transmission is above a threshold for a period of time, sending a message over the link to the second network entity that instructs the second network entity to cease transmission of control signals to the first network entity so that the control signals do not occupy bandwidth on the link that is required for data transmission over the link.

2. The method of claim 1, wherein the first and second network entities are physical hosts running virtual switching applications for hosted virtual machines.

3. The method of claim 1, wherein the message is a first message, the method further comprising:
   establishing control signal sessions on a plurality of links with a plurality network entities, wherein the network comprises the plurality of links and the plurality of network entities;
   monitoring rates of data transmission on the plurality of links; and
   when a particular monitored rate of data transmission on a particular link of the plurality of links is above the threshold for the period of time, sending a second message over the particular link to a particular network entity to instruct the particular network entity to cease transmission of control signals on the particular link.

4. The method of claim 1, wherein the message is a first message, the method further comprising sending a second message over the link to the second network entity, that instructs the second network entity to reset the control signal rate to its initial rate and transmit the control signals at the initial control signal rate, when the monitored rate of data signal transmission is below the threshold for a different period of time.

5. The method of claim 1, wherein the initial control signal rate is one control signal every 300 milliseconds.

6. The method of claim 1, wherein the initial control signal rate is based on an initial rate of data packets being transmitted over the link.

7. A non-transitory machine readable medium storing a program which when executed by at least one processing unit of a first network entity regulates transmission of control signals with a second network entity, the first and second network entities connected by a link, the program comprising sets of instructions for:
   at the first network entity, establishing a control signal session on the link with the second network entity, wherein the first network entity receives control signals at an initial rate from the second network entity;
   monitoring a rate of data signal transmission over the link, wherein the data signals are separate signals from the controls signals; and
   when the monitored rate of data signal transmission is above a threshold for a period of time, sending a message over the link to the second network entity that instructs the second network entity to cease transmission of control signals to the first network entity so that the control signals do not occupy bandwidth on the link that is required for data transmission over the link.

8. The non-transitory machine readable medium of claim 7, wherein the rate of data signal transmission is a rate of data signal transmission from the second network entity to the first network entity over the link.

9. The non-transitory machine readable medium of claim 7, wherein the program further comprises sets of instructions for:
   transmitting data to the second network entity over the link;
   transmitting control signals from the first network entity to the second network entity over the link at the initial rate; and
   when a message instructing the first network entity to adjust the control signal transmission rate has been received from the second network entity, adjusting the rate at which the first entity transmits control signals to the second network entity.

10. The non-transitory machine readable medium of claim 9, wherein the rate at which the first network entity receives control signals from the second network entity and the rate at which the first network entity transmits controls signals to the second network entity are different.

11. The non-transitory machine readable medium of claim 7, wherein the program is a virtual switching element.

12. The non-transitory machine readable medium of claim 7, wherein the control signals are hello packets.

13. The non-transitory machine readable medium of claim 7, wherein the control signals are echo packets.

14. A method for regulating transmission of control signals in a network, the network comprising a link connecting first and second network entities, the method comprising:
- transmitting control signals from the first network entity to the second network entity on the link at an initial control signal rate;
- monitoring a rate of data signal transmission on the link, wherein the data signals are separate signals from the controls signals; and
- when the monitored rate of data signal transmission is above a threshold for a period of time, sending a message over the link to the second network entity that instructs the second network entity to adjust the control signal rate and transmit the control signals at an adjusted control signal rate so that the control signals occupy less bandwidth on the link that is required for data transmission over the link.

15. The method of claim 14, wherein the message is a first message, the method further comprising:
- establishing control signal sessions on a plurality of links with a plurality network entities, wherein the network comprises the plurality of links and the plurality of network entities;
- monitoring rates of data signal transmission on the plurality of links; and
- when a particular monitored rate of data signal transmission on a particular link of the plurality of links is above the threshold for the period of time, sending a second message over the link to a particular network entity instructing the particular network entity to adjust a particular rate of transmission of control signals on the particular link so that the control signals occupy less bandwidth on the link that is required for data signal transmission over the link.

16. The method of claim 14, wherein the adjusted control signal rate is a reduced control signal rate.

17. The method of claim 14, wherein the threshold is a single unit of data and the period of time is one minute.

18. The method of claim 14, wherein the control signal rate is adjusted in proportion to the monitored rate of data signal transmission on the link.

19. The method of claim 14, wherein the message instructing the first network entity to adjust the control signal rate instructs the first network entity to reduce the control signal rate by a fixed amount.

20. The method of claim 14, wherein the initial control signal rate is within a range of one control signal every 100 milliseconds and one control signal every 10,000 milliseconds.

* * * * *